US009779064B2

(12) United States Patent
Belbin et al.

(10) Patent No.: US 9,779,064 B2
(45) Date of Patent: Oct. 3, 2017

(54) CLOUD ASSISTED RENDERING

(71) Applicant: CANON KABUSHIKI KAISHA, Tokyo (JP)

(72) Inventors: Joseph Leigh Belbin, Summer Hill (AU); Rolfe Craig Bozier, Hornsby Heights (AU)

(73) Assignee: Canon Kabushiki Kaisha, Tokyo (JP)

( * ) Notice: Subject to any disclaimer, the term of this patent is extended or adjusted under 35 U.S.C. 154(b) by 192 days.

(21) Appl. No.: 14/012,730

(22) Filed: Aug. 28, 2013

(65) Prior Publication Data

US 2014/0068429 A1    Mar. 6, 2014

(30) Foreign Application Priority Data

Aug. 30, 2012  (AU) .................................. 2012216550

(51) Int. Cl.
*G06F 17/00*     (2006.01)
*G06F 17/21*     (2006.01)
*G06F 17/30*     (2006.01)

(52) U.S. Cl.
CPC ...... *G06F 17/212* (2013.01); *G06F 17/30893* (2013.01)

(58) Field of Classification Search
CPC ....... G06F 21/60; G06F 3/1228; G06F 21/608
See application file for complete search history.

(56) References Cited

U.S. PATENT DOCUMENTS

| 7,542,164 | B2 * | 6/2009 | Ebner et al. .................. 358/1.2 |
| 7,804,612 | B2 | 9/2010 | Wang |
| 7,917,845 | B2 * | 3/2011 | Harrington ......... G06F 17/2229 715/234 |
| 7,936,472 | B2 | 5/2011 | Ferlitsch et al. |
| 8,189,225 | B1 * | 5/2012 | Lo et al. ...................... 358/1.15 |
| 2002/0112019 | A1 * | 8/2002 | Watanabe ..................... 709/213 |
| 2003/0142335 | A1 * | 7/2003 | Oleinik ................. G06F 3/1206 358/1.13 |
| 2007/0030528 | A1 * | 2/2007 | Quaeler ............ G06F 17/30634 358/453 |
| 2007/0206012 | A1 * | 9/2007 | Combes .................. G06T 11/20 345/441 |
| 2008/0112013 | A1 * | 5/2008 | Ferlitsch et al. ............. 358/3.28 |
| 2008/0222522 | A1 * | 9/2008 | Morales ................ G06F 17/243 715/276 |

(Continued)

*Primary Examiner* — Scott Baderman
*Assistant Examiner* — Barbara Level
(74) *Attorney, Agent, or Firm* — Canon U.S.A., Inc. IP Division

(57) ABSTRACT

Described is a method of rendering first page data to a document, by receiving the first page data in a first format, removing a portion of the first page data having a predetermined attribute; storing the removed data in a memory of the rendering device; inserting references to the removed data into the first page data to produce altered first page data in the first format; transmitting the altered first page data to a platform service device; forming second page data in a second format, the second page data containing the inserted references; and receiving, by the rendering device, the second page data from the platform service device, the rendering device rendering to the document the second page data using the inserted references and the copied data stored in the memory of the rendering device.

20 Claims, 27 Drawing Sheets

(56) References Cited

U.S. PATENT DOCUMENTS

| | | | |
|---|---|---|---|
| 2008/0256438 A1* | 10/2008 | Harman | G06F 17/30569 715/239 |
| 2009/0300481 A1* | 12/2009 | Imai | 715/234 |
| 2011/0173676 A1* | 7/2011 | Peckover | 726/3 |
| 2011/0194140 A1* | 8/2011 | Sweet et al. | 358/1.15 |
| 2011/0205586 A1* | 8/2011 | Takahashi et al. | 358/1.15 |
| 2011/0239125 A1* | 9/2011 | Kristensen | G06F 21/31 715/743 |
| 2012/0084350 A1* | 4/2012 | Xie | 709/203 |
| 2012/0096399 A1* | 4/2012 | Pangrazio, III | 715/810 |
| 2013/0111335 A1* | 5/2013 | Tse | G06F 3/1208 715/255 |
| 2014/0002845 A1* | 1/2014 | Gutnik | G06F 21/608 358/1.14 |

\* cited by examiner

```
%PDF-1.3

1 0 obj<</Type/Catalog/Pages 3 0 R>>
endobj 3 0 obj<</Type/Pages/Count 1/Kids[ 5 0 R]>>
endobj 4 0 obj
<<
    /Type /Xobject
    /BitsPerComponent 8
    /ColorSpace/DeviceRGB
    /Filter /DCTDecode
    /Height 7015
    /Width 4960
    /Length 5942499
    /Subtype /Image
>>
stream
dab45821054abv
```

— 610

— 620

— 630

```
78368342978494
endstream
endobj 5 0 obj
<<
    /Type/Page
    /Contents 6 0 R
    /MediaBox[ 0.000000 0.000000 4960.000000 7015.000000]
    /Parent 3 0 R
    /Resources
       <<
          /XObject<</XOb4 4 0 R>>
       >>
>>
endobj 6 0 obj<</Filter/FlateDecode/Length 42>>
stream
<CONTENT STREAM>
endstream
endobj trailer
<</Root 1 0 R>>
%%EOF
```

Fig. 6

```
%PDF-1.3

1 0 obj<</Type/Catalog/Pages 3 0 R>>
endobj 3 0 obj<</Type/Pages/Count 1/Kids[ 5 0 R]>>
endobj 4 0 obj
<<
   /Type /Xobject
   /BitsPerComponent 8
   /ColorSpace/DeviceRGB
   /Filter /RLE
   /Height 7015
   /Width 4960
   /Length <LENGTH OF NEW IMAGE DATA>
   /Subtype /Image
   /SPECIAL_IMAGE_TAG Image_1.jpg
>>
stream
<NEW RUN LENGTH ENCODED IMAGE DATA WITH A SINGLE COLOUR>
endstream
endobj 5 0 obj
<<
   /Type/Page
   /Contents 6 0 R
   /MediaBox[ 0.000000 0.000000 4960.000000 7015.000000]
   /Parent 3 0 R
   /Resources
      <<
         /XObject<</XOb4 4 0 R>>
      >>
>>
endobj 6 0 obj<</Filter/FlateDecode/Length 42>>
stream
<CONTENT STREAM>
endstream
endobj trailer
<</Root 1 0 R>>
%%EOF
```

- 810 (outer box)
- 830 → /Filter /RLE
- 820 → /SPECIAL_IMAGE_TAG Image_1.jpg
- 850 → /Length <LENGTH OF NEW IMAGE DATA>
- 840 → stream <NEW RUN LENGTH ENCODED IMAGE DATA WITH A SINGLE COLOUR>

Fig. 8

```
%PDF-1.3

1 0 obj<</Type/Catalog/Pages 3 0 R>>
endobj 2 0 obj<</Type/Outlines/Count 0>>
endobj 3 0 obj
<<
   /Type /Pages /Kids [ 4 0 R ] /Count 1
   /Resources
      << /Font << /F13 6 0 R /F14 7 0 R >>
>>
endobj 4 0 obj
<</Type/Page /Parent 3 0 R /MediaBox[ 0 0 600 800] /Content 5 0 R>>
endobj 5 0 obj<< /Length 97 >>
stream
BT
  /F13 30 Tf
    1 0 0 1 150 600 Tm
  (The quick brown fox) Tj
  /F14 10 Tf
    1 0 0 2 150 550 Tm
  (jumped over the lazy dog) Tj
  /F13 15 Tf
    2 0 0 1 150 500 Tm
  (Bogosity High) Tj
ET
endstream
endobj 6 0 obj
   << /Type /Font /Subtype /Type1 /BaseFont /Helvetica >>
endobj 7 0 obj
   << /Type /Font /Subtype /Type1 /BaseFont /Times-Roman >>
endobj trailer
<</Root 1 0 R>>
%%EOF
```

- 910 (page frame)
- 920 (Resources/Font)
- 950 (Length)
- 960, 970, 980 (text operators)
- 930 (6 0 obj font)
- 940 (7 0 obj font)

Fig. 9

```
%PDF-1.3

1 0 obj<</Type/Catalog/Pages 3 0 R>>
endobj 2 0 obj<</Type/Outlines/Count 0>>
endobj 3 0 obj
<<
   /Type /Pages /Kids [ 4 0 R ] /Count 1
   /Resources
   << /Font << /F13 6 0 R /F14 7 0 R >>
>>
endobj 4 0 obj
<</Type/Page /Parent 3 0 R /MediaBox[ 0 0 600 800] /Content 5 0 R>>
endobj 5 0 obj<< /Length 0 >>
stream
BT
<SPECIAL_TEXT_TAG Ref: String 1 BBox: A1  B1 C1  D1  150 600>
<SPECIAL_TEXT_TAG Ref: String 2 BBox: A2 B2 C2  D2  150 550>
<SPECIAL_TEXT_TAG Ref: String 3 BBox: A3  B3 C3  D3  150 500>
ET
endstream
endobj 6 0 obj
<<
    /Type /Font /Subtype /Type1 /BaseFont /Helvetica
    /SPECIAL_FONT_TAG: 30pt;<glyph list>
    /SPECIAL_FONT_TAG: 15pt;<glyph list>
>>
endobj 7 0 obj
<<
    /Type /Font /Subtype /Type1 /BaseFont /Times-Roman
    /SPECIAL_FONT_TAG: 10pt;<glyph list>
>>
endobj trailer
<</Root 1 0 R>>
%%EOF
```

CLOUD ASSISTED RENDERING

REFERENCE TO RELATED PATENT APPLICATION

This application claims the benefit under 35 U.S.C. §119 of the filing date of Australian Patent Application No. 2012216550, filed 30 Aug. 2012, hereby incorporated by reference in its entirety as if fully set forth herein.

TECHNICAL FIELD

The present invention relates generally to computer graphics and, in particular, to a method of rendering a plurality of graphical objects.

BACKGROUND

Computer applications such as a word processing application 115 executing on a client device 105 (see FIG. 1) often produce graphics that need to be rendered to pixel colour values for output to a rendering device such as 135 in FIG. 1 which can, for example, be a display or a printer.

Such computer applications, referred to hereinafter merely as "computer applications", generally specify these graphics, referred to hereinafter as high-level graphics, using a high-level page description language (PDL), such as PostScript or PDF by Adobe, or the Open XML Paper Specification (OpenXPS). Alternatively, the computer application may specify these high-level graphics using a graphics interface, such as Microsoft's GDI or GDI+.

The high-level graphics to be rendered are described using graphic objects or commands, referred to hereinafter as high-level graphic commands. In order for the rendering device 135 to render the objects associated with these high-level graphic commands, the rendering device 135 needs to understand all the high-level graphic commands provided by each PDL or interface that the rendering device is intended to support.

In addition, the rendering device may need to perform a large amount of processing, including scan-conversion and compositing. To process the high-level graphic commands efficiently, the rendering device typically needs a large amount of processing power and/or memory.

One method of avoiding the need for the rendering device to support high-level graphic commands in multiple formats is to convert the high-level graphic commands to a set of lower-level commands that are understood by the rendering device. This is usually done using a driver software application, referred to hereinafter as a driver, which is installed on the computer 105 upon which the computer application 115 is running. The driver converts the high-level graphic commands produced by the computer application 115 into a format understood by the rendering device 135. However this requires that a driver be installed on every computer which will communicate with the rendering device.

One method described in the prior art that does not require a driver executing on the computer 105 running the computer application 115 uses a computer application running on a remote server computer 120 known as a cloud server or a platform service device. In this method, the rendering device 135 receives, from the computer application 115 executing on the client device 105, information specifying what is to be rendered to a page. This information, referred to hereinafter as "page data", is in a high-level graphic command format. The rendering device 135 sends the page data to the cloud server 120, which translates it into a format understood by the rendering device 135. This has the advantage that no driver is required on the client device 105, and furthermore, a large amount of processing typically performed by the rendering device 135 to render the page may be performed on the cloud sever 120.

However this approach has several disadvantages. Firstly, if the high-level graphic commands that need to be sent to the cloud server 120 comprise a large amount of data, particularly image data, the page may be slow to render, as the page data needs to be first sent to the cloud server 120, and then re-encoded and sent back to the rendering device 135. A second disadvantage is that the page data in the page may be sensitive or confidential, and accordingly the page data should not be transmitted to the remote server 120 for security reasons. For example, it is clear that proprietary information which cannot be shared outside of an organisation should not be sent to the remote server 120 for rendering, in order to preclude the proprietary information running the risk of being accessed without authority by a third party.

SUMMARY

It is an object of the present invention to substantially overcome, or at least ameliorate, one or more disadvantages of existing arrangements.

Disclosed are arrangements, referred to as Selective Data Substitution (SDS) arrangements, which seek to address the above problems by having a rendering device such as a printer perform (a) forming, from a source document an altered document by extracting certain information, depending upon the attributes of that information, from the source document to be rendered, (b) substituting references to where the removed information is stored, and (c) sending the altered document to a remote cloud server which performs (i) processor and memory intensive processing on the altered document to form a more easily renderable document, and (ii) sends the more easily renderable document back to the printer for rendering, whereupon the printer (d) incorporates the originally extracted information into the more easily renderable document and then (e) rendering that document.

According to a first aspect of the present invention, there is provided a method of rendering first page data having one or more attributes to a document, said method comprising the steps of:

receiving, by a rendering device, the first page data in a first format, said rendering device having a memory;

removing, by the rendering device, a portion of said first page data having a predetermined attribute;

storing said removed data in the memory of the rendering device;

inserting, by the rendering device, references to the removed data into the first page data to produce altered first page data in the first format;

transmitting the altered first page data to a platform service device;

forming from the altered first page data, by the platform service device, second page data in a second format, said second page data containing the inserted references; and receiving, by the rendering device, the second page data from the platform service device, said rendering device rendering to the document the second page data using the inserted references and the copied data stored in the memory of the rendering device.

According to another aspect of the present invention, there is provided a method of rendering first page data having one or more attributes to a document by a rendering device, said method comprising the steps of:
- receiving the first page data in a first format;
- removing a portion of said first page data having a predetermined attribute;
- storing said removed data in a memory of the rendering device;
- inserting references to the removed data into the first page data to produce altered first page data in the first format;
- transmitting the altered first page data to a platform service device;
- receiving, from the platform service device, second page data in a second format, said second page data containing the inserted references, said second page data having been formed from the altered first page data by the platform service device, said rendering device rendering to the document the second page data using the inserted references and the copied data stored in the memory of the rendering device.

According to another aspect of the present invention, there is provided a method of secure printing first page data having one or more attributes to a document, said method comprising the steps of:
- receiving, by a rendering device, the first page data in a first format, said rendering device having a memory;
- removing a portion of said first page data satisfying a predetermined security attribute, said removed data being stored in the memory of the rendering device;
- inserting references to the removed data into the first page data to produce altered first page data in the first format;
- transmitting the altered first page data to a platform service device;
- forming, using the platform service device, second page data in a second format, said second page data containing the inserted references; and
- receiving, by the rendering device, the second page data, said rendering device rendering the second page data to the document using the inserted references and the removed data stored in the memory of the rendering device.

According to another aspect of the present invention, there is provided a system for rendering first page data having one or more attributes to a document, said system comprising:
- a rendering device;
- a platform service device; and
- a client device; the rendering device, the platform service device and the client device configured to communicate over a network; wherein:
- the rendering device comprises a processor and a memory storing a computer executable controlling program for directing the processor to perform a method comprising the steps of:
  - receiving from the client device the first page data in a first format;
  - removing a portion of said first page data having a predetermined attribute;
  - storing said removed data in a memory of the rendering device;
  - inserting references to the removed data into the first page data to produce altered first page data in the first format; and
  - transmitting the altered first page data to the platform service device; wherein the platform service device comprises a processor and a memory storing a computer executable cloud program for directing the processor to perform a method comprising the steps of:
    - forming from the altered first page data second page data in a second format, said second page data containing the inserted references; and wherein the computer executable controlling program is further configured to direct the processor of the rendering device to perform the steps of:
    - receiving the second page data, said rendering device rendering to the document the second page data using the inserted references and the copied data stored in the memory of the rendering device.

According to another aspect of the present invention, there is provided a rendering device for rendering first page data having one or more attributes to a document, said rendering device comprising:
- a processor and a memory storing a computer executable controlling program for directing the processor to perform the steps of:
- receiving the first page data in a first format;
- removing a portion of said first page data having a predetermined attribute;
- storing said removed data in a memory of the rendering device;
- inserting references to the removed data into the first page data to produce altered first page data in the first format;
- transmitting the altered first page data to a platform service device over a network;
- receiving second page data in a second format from the platform service device, said second page data having been formed from the altered first page data, said second page data containing the inserted references; and wherein the computer executable controlling program is further configured to direct the processor of the rendering device to perform the steps of:
- rendering to the document the second page data using the inserted references and the copied data stored in the memory of the rendering device.

According to another aspect of the present invention, there is provided a computer readable non-transitory memory medium storing a computer executable program for directing one or more processors to execute a method of rendering first page data having one or more attributes to a document, said method comprising the steps of:
- receiving, by a rendering device, the first page data in a first format, said rendering device having a memory;
- removing, by the rendering device, a portion of said first page data having a predetermined attribute;
- storing said removed data in the memory of the rendering device;
- inserting, by the rendering device, references to the removed data into the first page data to produce altered first page data in the first format;
- transmitting the altered first page data to a platform service device;
- forming from the altered first page data, by the platform service device, second page data in a second format, said second page data containing the inserted references; and
- receiving, by the rendering device, the second page data, said rendering device rendering to the document the second page data using the inserted references and the copied data stored in the memory of the rendering device.

According to another aspect of the present invention, there is provided a computer readable non-transitory memory medium storing a computer executable program for directing one or more processors to execute a method of rendering first page data having one or more attributes to a document by a rendering device, said method comprising the steps of:

receiving the first page data in a first format;

removing a portion of said first page data having a predetermined attribute;

storing said removed data in a memory of the rendering device;

inserting references to the removed data into the first page data to produce altered first page data in the first format;

transmitting the altered first page data to a platform service device;

receiving, from the platform service device, second page data in a second format, said second page data containing the inserted references, said second page data having been formed from the altered first page data by the platform service device, said rendering device rendering to the document the second page data using the inserted references and the copied data stored in the memory of the rendering device.

Other aspects of the invention are also disclosed.

BRIEF DESCRIPTION OF THE DRAWINGS

One or more embodiments of the invention will now be described with reference to the following drawings, in which:

FIG. 6 shows an exemplary Input PDL File on which the examples of the SDS arrangement may be practised;

FIG. 8 shows a Modified PDL File which has been modified according to one example of the SDS arrangement;

FIG. 9 shows an exemplary Input PDL File on which the examples of the SDS arrangement may be practised;

FIG. 11 shows a Modified PDL File which has been modified according to one example of the SDS arrangement;

DETAILED DESCRIPTION INCLUDING BEST MODE

Figure 1:
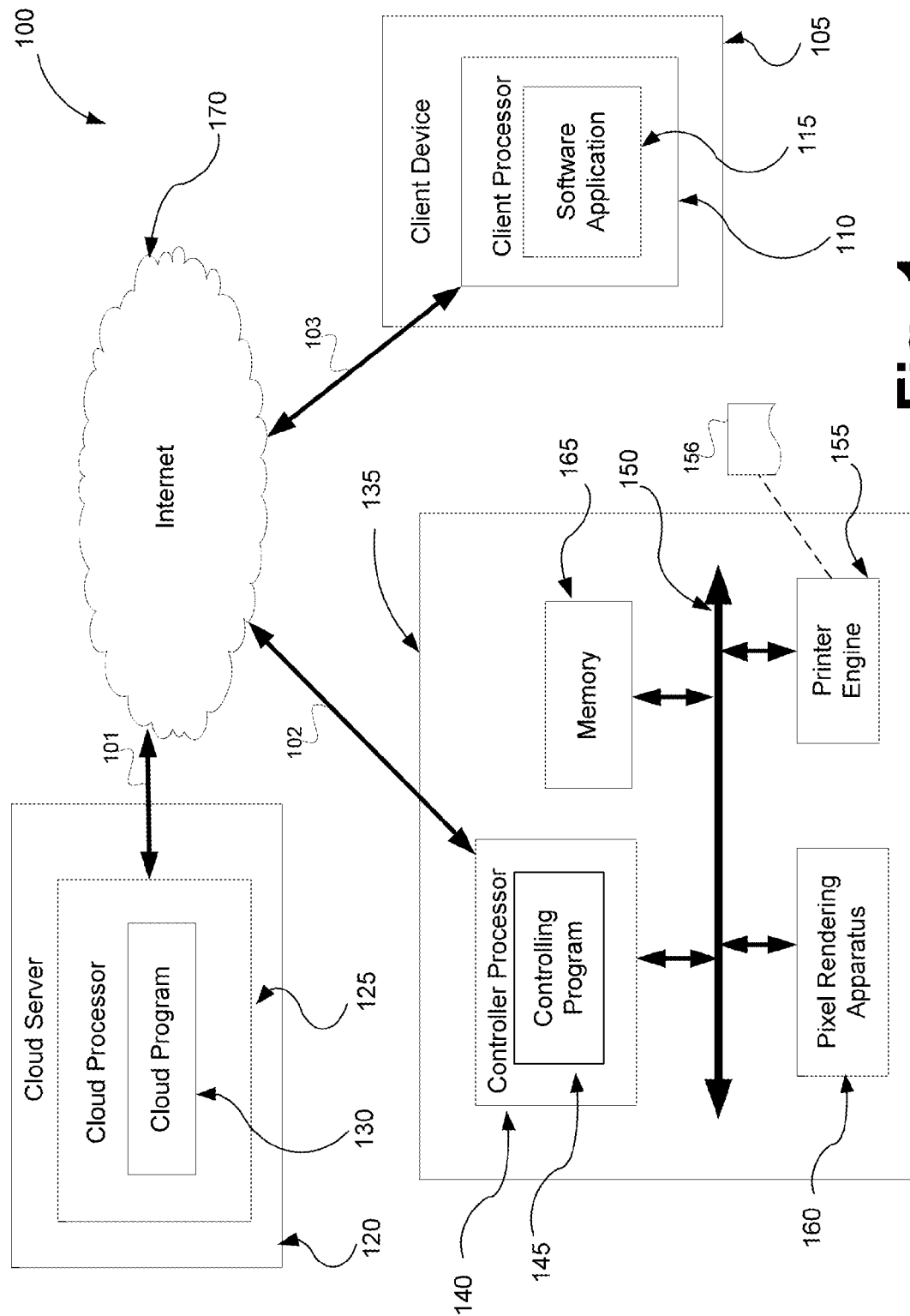
FIG. 1 is a schematic block diagram of a pixel rendering system on which the examples of the SDS arrangement may be practised.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and the section above relating to prior art arrangements relate to discussions of documents or devices which may form public knowledge through their respective publication and/or use. Such discussions should not be interpreted as a representation by the present inventor(s) or the patent applicant that such documents or devices in any way form part of the common general knowledge in the art.

The present inventors realized that there is a need for the cloud server 120 to assist with rendering, while reducing the bandwidth and maintaining the security of the data sent to the cloud server.

FIG. 1 shows a schematic block diagram of a pixel rendering system 100, for rendering computer graphic object images, on which the disclosed SDS arrangements may be practised. The pixel rendering system 100 comprises the mobile device (also referred to as a client device) 105, the cloud server 120 (also referred to as a platform service device), and the rendering device 135 which in the following description is referred to as a printer. The rendering device 135 is configured to communicate with the mobile device 105 and the cloud server 120 via a communications network such as the Internet 170, as depicted by respective connections 102, 103 and 101.

The mobile device 105 comprises a client processor 110 for executing the software application 115 such as a word processor or graphical software application.

The cloud server 120 comprises a cloud processor 125 for executing a SDS cloud program 130, used to assist in the rendering.

The rendering device 135 comprises a controller processor 140 for executing a SDS controlling program 145, a pixel rendering apparatus 160, a memory 165, and the rendering device 155, coupled via a bus 150. The pixel rendering apparatus 160 may be in the form of an ASIC coupled via the bus 150 to the controller processor 140, and the printer engine 195. The pixel rendering apparatus 160 may also be implemented in software executed in the controller processor 140.

In the pixel rendering system 100, the software application 115 executing in the client device 105 creates page data for page-based documents, each such document comprising one or more pages, where the page data for each page describes objects such as text, lines, fill regions, and image data. The software application 115 sends, to the SDS controlling program 145 executing on the controller processor 140 of the rendering device 135 via the Internet 170, a high level description of the page data in the form of a Page Description Language (PDL) file comprising high-level graphic commands.

The cloud server 120, the client device 105, and the rendering device 135 each comprise at least some of the structural and functional modules typically found in general-purpose computers, described hereinafter in more detail in relation to FIGS. 24A and 24B. Although the detailed description relating to FIGS. 24A and 24B is directed primarily to the cloud server 120, the description also applies mutatis mutandis to the client device 105 and the rendering device 135.

Figure 24A:
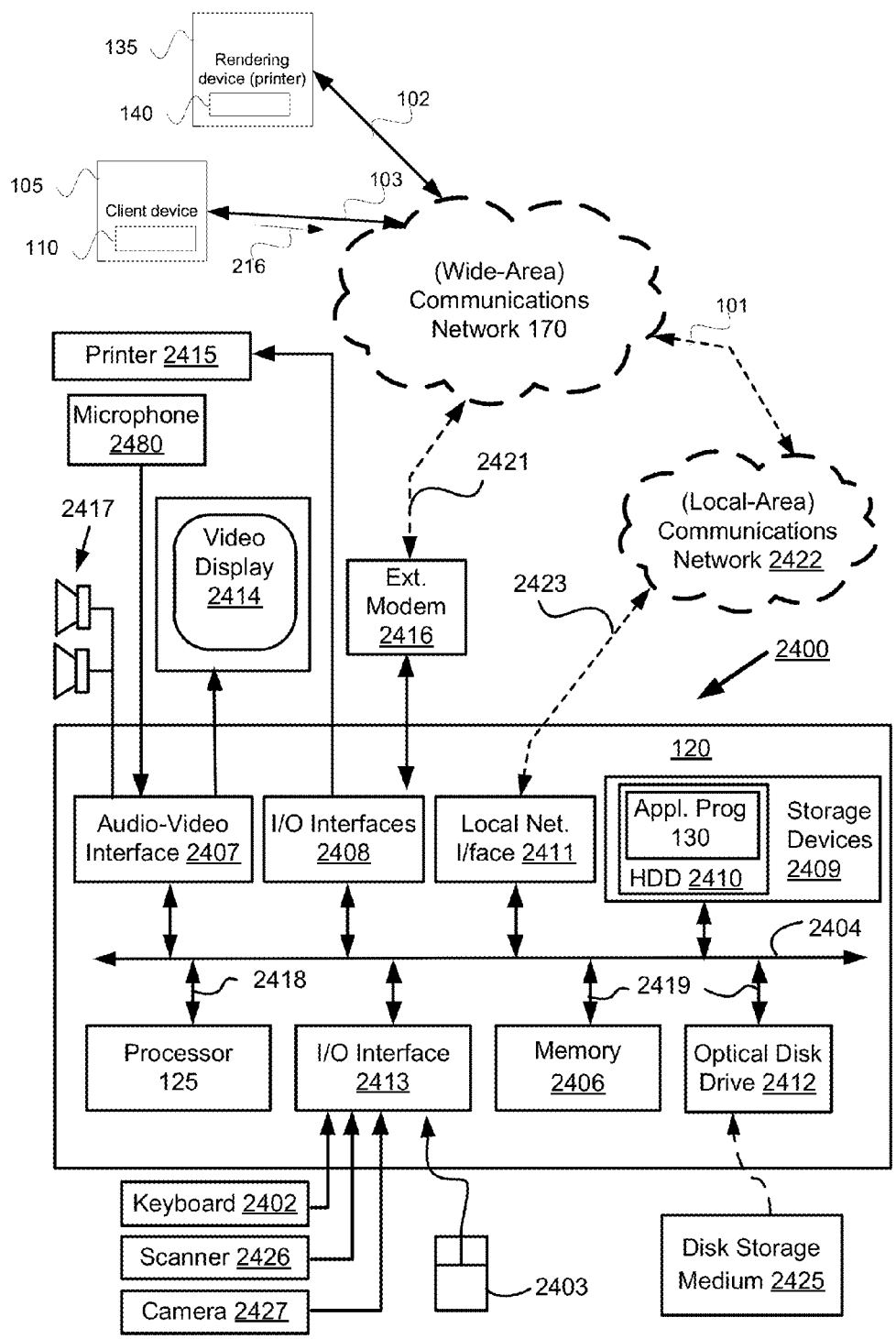
FIGS. 24A and 24B depict a general-purpose computer system 2400, upon which the various SDS arrangements described can be practiced.
Figure 24B:
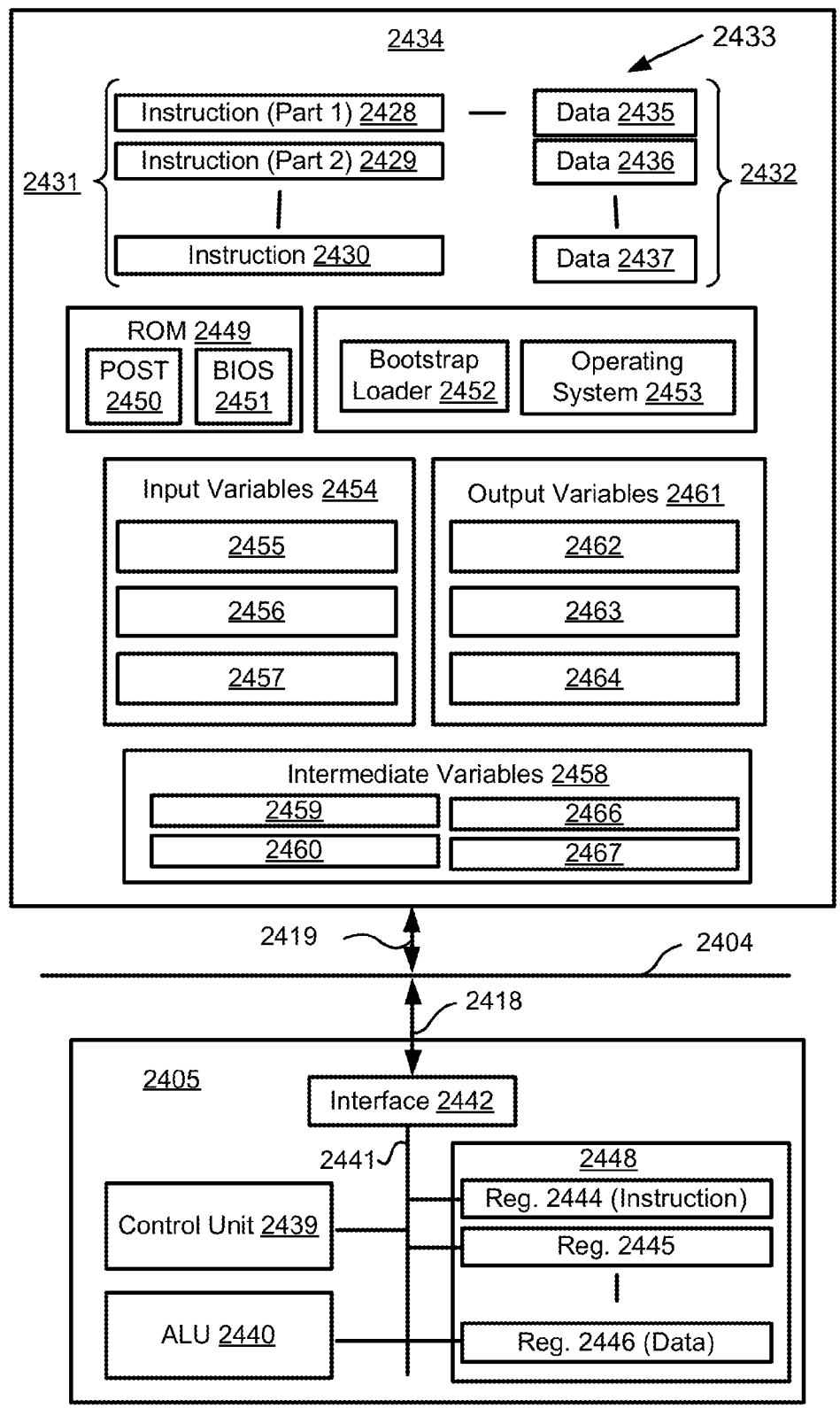
Figure 25A:
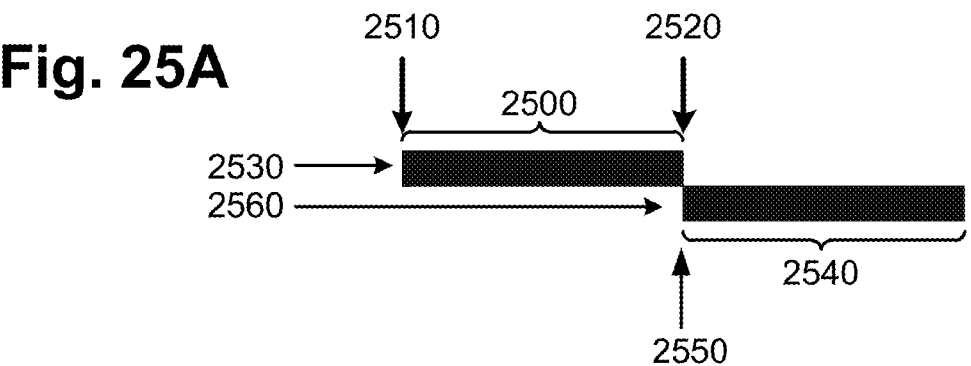
FIGS. 25A-H depict edge extension conditions used during fillmap construction
Figure 25B:
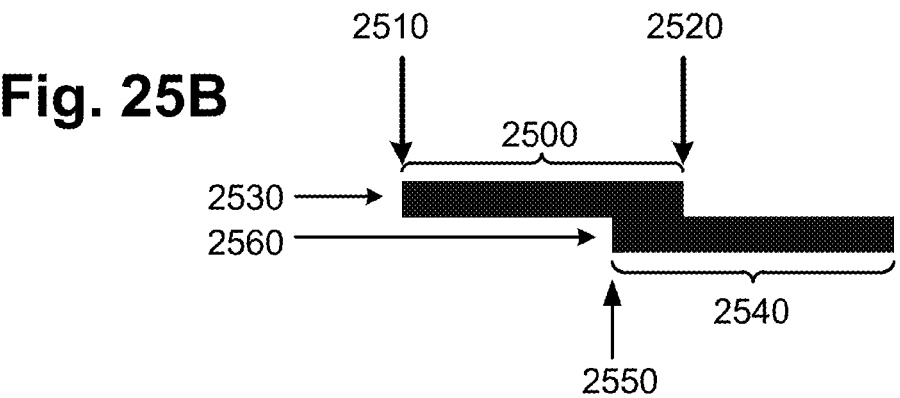
Figure 25C:
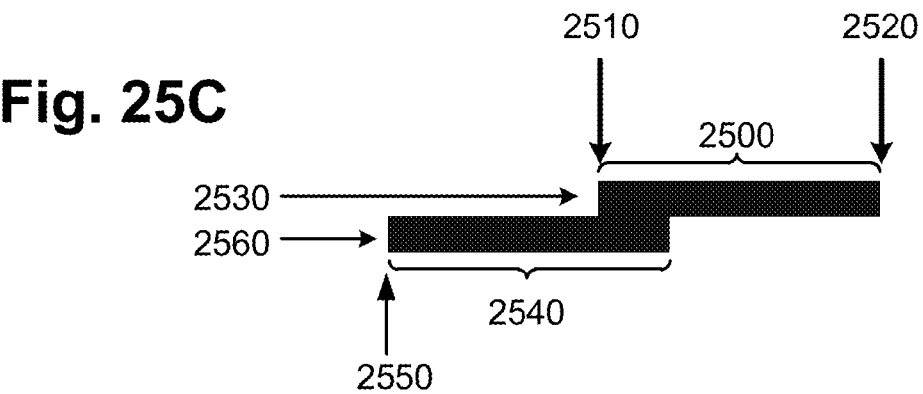
Figure 25D:
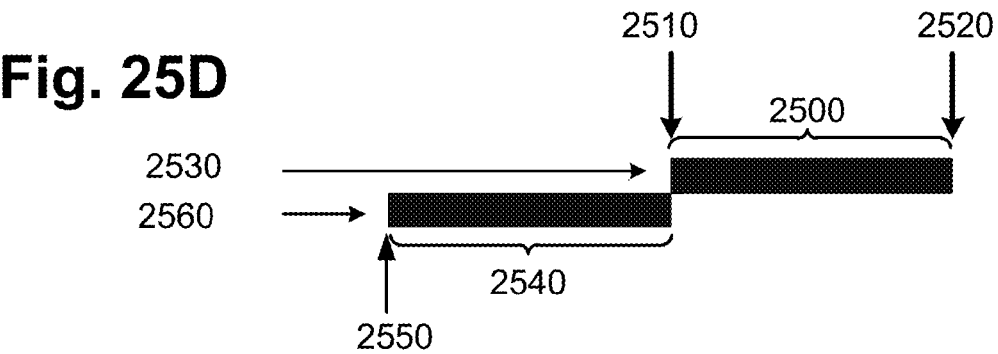
Figure 25E:
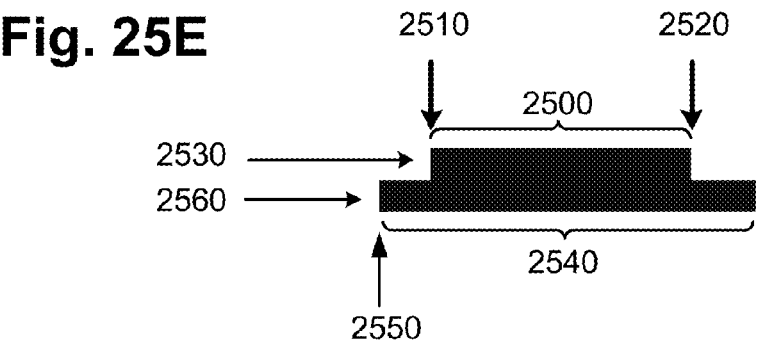
Figure 25F:
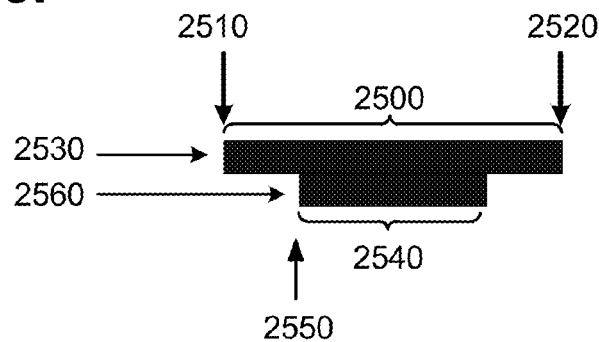
Figure 25G:
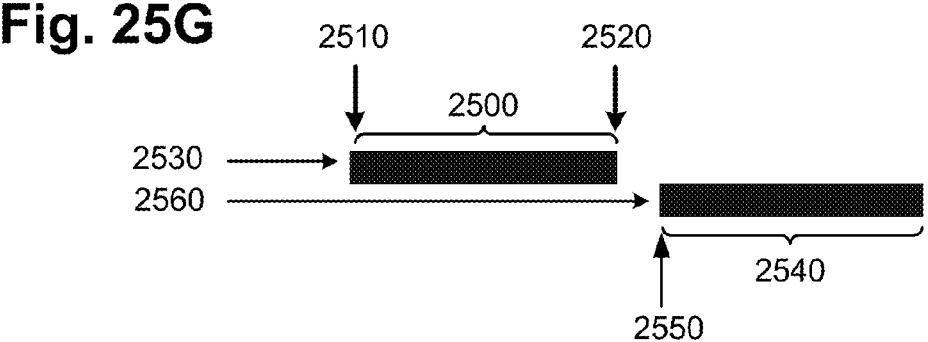
Figure 25H:
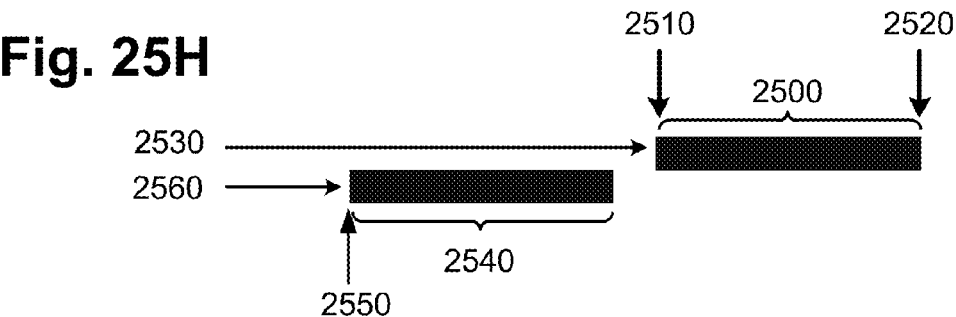

FIGS. 24A and 24B depict a general-purpose computer system 2400, upon which the various arrangements described can be practised.

As seen in FIG. 24A, the computer system 2400 includes: a computer module which is the cloud server 120; input devices such as a keyboard 2402, a mouse pointer device 2403, a scanner 2426, a camera 2427, and a microphone 2480; and output devices including a printer 2415, a display device 2414 and loudspeakers 2417. An external Modulator-Demodulator (Modem) transceiver device 2416 may be used by the cloud server 120 for communicating to and from the print system 135 and the client device 105 over the communications network 170 via a connection 2421. The communications network 170 may be a wide-area network (WAN), such as the Internet, a cellular telecommunications network, or a private WAN. Where the connection 2421 is a telephone line, the modem 2416 may be a traditional "dial-up" modem. Alternatively, where the connection 2421 is a high capacity (e.g., cable) connection, the modem 2416 may be a broadband modem. A wireless modem may also be used for wireless connection to the communications network 170.

The cloud server 120 typically includes at least the one processor unit 125, and a memory unit 2406. For example, the memory unit 2406 may have semiconductor random access memory (RAM) and semiconductor read only memory (ROM). The cloud server 120 also includes an number of input/output (I/O) interfaces including: an audio-video interface 2407 that couples to the video display 2414, loudspeakers 2417 and microphone 2480; an I/O interface 2413 that couples to the keyboard 2402, mouse 2403, scanner 2426, camera 2427 and optionally a joystick or other human interface device (not illustrated); and an interface 2408 for the external modem 2416 and printer 2415. In some implementations, the modem 2416 may be incorporated within the computer module 120, for example within the interface 2408. The computer module 120 also has a local network interface 2411, which permits coupling of the computer system 2400 via a connection 2423 to a local-area communications network 2422, known as a Local Area Network (LAN). As illustrated in FIG. 24A, the local communications network 2422 may also couple to the wide network 170 via a connection 101, which would typically include a so-called "firewall" device or device of similar functionality. The local network interface 2411 may comprise an Ethernet circuit card, a Bluetooth® wireless arrangement or an IEEE 802.11 wireless arrangement; however, numerous other types of interfaces may be practiced for the interface 2411.

The I/O interfaces 2408 and 2413 may afford either or both of serial and parallel connectivity, the former typically being implemented according to the Universal Serial Bus (USB) standards and having corresponding USB connectors (not illustrated). Storage devices 2409 are provided and typically include a hard disk drive (HDD) 2410. Other storage devices such as a floppy disk drive and a magnetic tape drive (not illustrated) may also be used. An optical disk drive 2412 is typically provided to act as a non-volatile source of data. Portable memory devices, such optical disks (e.g., CD-ROM, DVD, Blu Ray Disc™), USB-RAM, portable, external hard drives, and floppy disks, for example, may be used as appropriate sources of data to the system 2400.

The components 125, 2406 and 2407 to 2413 of the cloud server 120 typically communicate via an interconnected bus 2404 and in a manner that results in a conventional mode of operation of the computer system 2400 known to those in the relevant art. For example, the processor 125 is coupled to the system bus 2404 using a connection 2418. Likewise, the memory 2406 and optical disk drive 2412 are coupled to the system bus 2404 by connections 2419. Examples of computers on which the described arrangements can be practised include IBM-PC's and compatibles, Sun Sparcstations, Apple Mac™ or a like computer systems.

The SDS method may be implemented using the computer system 2400 wherein the processes of FIGS. 2-5, 17-21, and 23, to be described, may be implemented as one or more software application programs 130 and 145 executable within the computer system 2400. In particular, the steps of the SDS method are effected by instructions 2431 (see FIG. 24B) in the software 130 and 145 that are carried out within the computer system 2400. The software instructions 2431 may be formed as one or more code modules 130 and 145 each for performing one or more particular tasks. The software may also be divided into two separate parts, in which a first part and the corresponding code modules performs the SDS methods and a second part and the corresponding code modules manage a user interface between the first part and the user.

The software may be stored in a computer readable medium, including the storage devices described below, for example. The software is loaded into the computer system 2400 from the computer readable medium, and then executed by the computer system 2400. A computer readable medium having such software or computer program recorded on the computer readable medium is a computer program product. The use of the computer program product in the computer system 2400 preferably effects an advantageous apparatus for performing the SDS method.

The software 130 is typically stored in the HDD 2410 or the memory 2406. The software is loaded into the computer system 2400 from a computer readable medium, and executed by the computer system 2400. Thus, for example, the software 130 may be stored on an optically readable disk storage medium (e.g., CD-ROM) 2425 that is read by the optical disk drive 2412. A computer readable medium having such software or computer program recorded on it is a computer program product. The use of the computer program product in the computer system 2400 preferably effects an apparatus for performing the SDS method.

In some instances, the application programs 130 and 145 may be supplied to the user encoded on one or more CD-ROMs 2425 and read via the corresponding drives such as 2412, or alternatively may be read by the user from the networks 170 or 2422. Still further, the software can also be loaded into the computer system 2400 from other computer readable media. Computer readable storage media refers to any non-transitory tangible storage medium that provides recorded instructions and/or data to the computer system 2400 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 120. Examples of transitory or non-tangible computer readable transmission media that may also participate in the provision of software, application programs, instructions and/or data to the computer module 120 include radio or infra-red transmission channels as well as a network connection to another computer or networked device, and the Internet or Intranets including e-mail transmissions and information recorded on Websites and the like.

The second part of the application programs 130 and the corresponding code modules mentioned above may be executed to implement one or more graphical user interfaces (GUIs) to be rendered or otherwise represented upon the display 2414. Through manipulation of typically the keyboard 2402 and the mouse 2403, a user of the computer system 2400 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 2417 and user voice commands input via the microphone 2480.

FIG. 24B is a detailed schematic block diagram of the processor 125 and a "memory" 2434. The memory 2434 represents a logical aggregation of all the memory modules (including the HDD 2409 and semiconductor memory 2406) that can be accessed by the computer module 120 in FIG. 24A.

When the cloud server 120 is initially powered up, a power-on self-test (POST) program 2450 executes. The POST program 2450 is typically stored in a ROM 2449 of the semiconductor memory 2406 of FIG. 24A. A hardware device such as the ROM 2449 storing software is sometimes referred to as firmware. The POST program 2450 examines hardware within the computer module 120 to ensure proper functioning and typically checks the processor 125, the memory 2434 (2409, 2406), and a basic input-output systems software (BIOS) module 2451, also typically stored in the ROM 2449, for correct operation. Once the POST program 2450 has run successfully, the BIOS 2451 activates the hard disk drive 2410 of FIG. 24A. Activation of the hard disk drive 2410 causes a bootstrap loader program 2452 that is resident on the hard disk drive 2410 to execute via the processor 125. This loads an operating system 2453 into the RAM memory 2406, upon which the operating system 2453 commences operation. The operating system 2453 is a system level application, executable by the processor 125, to fulfil various high level functions, including processor management, memory management, device management, storage management, software application interface, and generic user interface.

The operating system 2453 manages the memory 2434 (2409, 2406) to ensure that each process or application running on the computer module 120 has sufficient memory in which to execute without colliding with memory allocated to another process. Furthermore, the different types of memory available in the system 2400 of FIG. 24A must be used properly so that each process can run effectively. Accordingly, the aggregated memory 2434 is not intended to illustrate how particular segments of memory are allocated (unless otherwise stated), but rather to provide a general view of the memory accessible by the computer system 2400 and how such is used.

As shown in FIG. 24B, the processor 125 includes a number of functional modules including a control unit 2439, an arithmetic logic unit (ALU) 2440, and a local or internal memory 2448, sometimes called a cache memory. The cache memory 2448 typically include a number of storage registers 2444-2446 in a register section. One or more internal busses 2441 functionally interconnect these functional modules. The processor 125 typically also has one or more interfaces 2442 for communicating with external devices via the system bus 2404, using a connection 2418. The memory 2434 is coupled to the bus 2404 using a connection 2419.

The application program 130 includes a sequence of instructions 2431 that may include conditional branch and loop instructions. The program 130 may also include data 2432 which is used in execution of the program 130. The instructions 2431 and the data 2432 are stored in memory locations 2428, 2429, 2430 and 2435, 2436, 2437, respectively. Depending upon the relative size of the instructions 2431 and the memory locations 2428-2430, a particular instruction may be stored in a single memory location as depicted by the instruction shown in the memory location 2430. Alternately, an instruction may be segmented into a number of parts each of which is stored in a separate memory location, as depicted by the instruction segments shown in the memory locations 2428 and 2429.

In general, the processor 125 is given a set of instructions which are executed therein. The processor 1105 waits for a subsequent input, to which the processor 125 reacts to by executing another set of instructions. Each input may be provided from one or more of a number of sources, including data generated by one or more of the input devices 2402, 2403, data received from an external source across one of the networks 170, 2402, data retrieved from one of the storage devices 2406, 2409 or data retrieved from a storage medium 2425 inserted into the corresponding reader 2412, all depicted in FIG. 24A. The execution of a set of the instructions may in some cases result in output of data. Execution may also involve storing data or variables to the memory 2434.

The disclosed SDS arrangements use input variables 2454, which are stored in the memory 2434 in corresponding memory locations 2455, 2456, 2457. The SDS arrangements produce output variables 2461, which are stored in the memory 2434 in corresponding memory locations 2462, 2463, 2464. Intermediate variables 2458 may be stored in memory locations 2459, 2460, 2466 and 2467.

Referring to the processor 125 of FIG. 24B, the registers 2444, 2445, 2446, the arithmetic logic unit (ALU) 2440, and the control unit 2439 work together to perform sequences of micro-operations needed to perform "fetch, decode, and execute" cycles for every instruction in the instruction set making up the program 130. Each fetch, decode, and execute cycle comprises:

a fetch operation, which fetches or reads an instruction 2431 from a memory location 2428, 2429, 2430;

a decode operation in which the control unit 2439 determines which instruction has been fetched; and an execute operation in which the control unit 2439 and/or the ALU 2440 execute the instruction.

Thereafter, a further fetch, decode, and execute cycle for the next instruction may be executed. Similarly, a store cycle may be performed by which the control unit 2439 stores or writes a value to a memory location 2432.

Each step or sub-process in the processes of FIGS. 2-5, 17-21, and 23 is associated with one or more segments of the program 130 and is performed by the register section 2444, 2445, 2447, the ALU 2440, and the control unit 2439 in the processor 125 working together to perform the fetch, decode, and execute cycles for every instruction in the instruction set for the noted segments of the program 130.

The SDS method may alternatively be implemented in dedicated hardware such as one or more integrated circuits performing the SDS functions or sub functions. Such dedicated hardware may include graphic processors, digital signal processors, or one or more microprocessors and associated memories.

Figure 2:
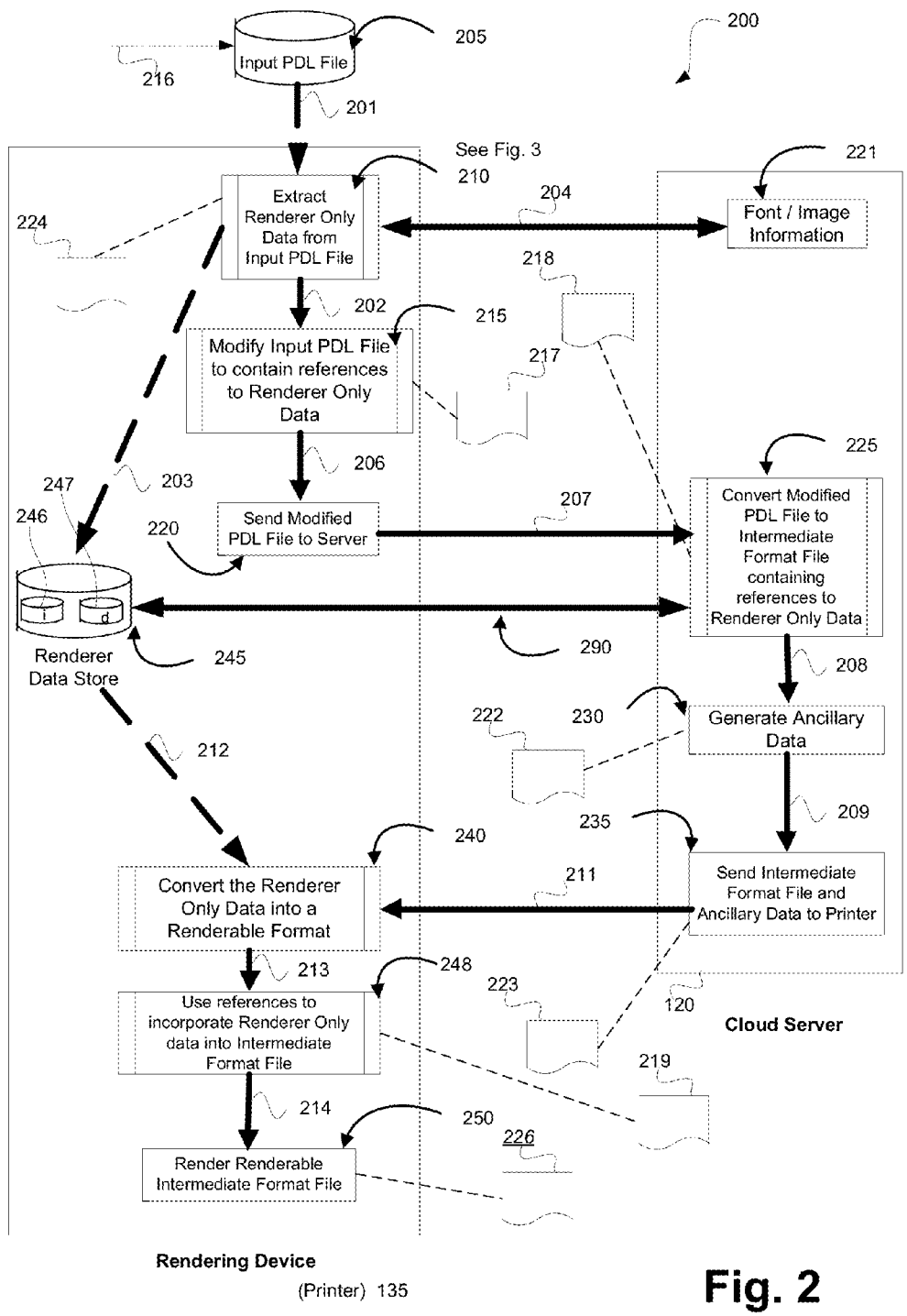
FIG. 2 is a schematic flow diagram illustrating a method of rendering an Input PDL File according to one example of the SDS arrangement.

FIG. 2 shows a schematic flow diagram of a rendering process 200 that can be used by the SDS controlling program 145 and the SDS cloud program 130 to render page data from an input PDL file 205, that is expressed using a high-level page description, to a page of an associated document 219. The SDS method can be used with any predefined type of document such as PDF, Microsoft Word and so on. The software programs 130, 145 and 115 need to be consistent with the type of document being processed.

The steps of the process 200 are distributed, in the present example, between the rendering device 135 and the cloud server 120 as shown in FIG. 2. Other distributions of functionality may also be used however.

The SDS controlling program 145 executing on the printer system 135 receives, as depicted by an arrow 216 from the client device 105 via the Internet 170, the input page data description file 205 for a page that is to be rendered. The PDL file 205 is typically stored in the renderer data store 245 which may be implemented by the rendering device memory 165.

The process 200 then moves, as depicted by an arrow 201, to a Data Extraction process 210. The Data Extraction process 210 copies data from the input PDL File 205, and stores the copied data 224, as depicted by an arrow 203, in the Renderer Data Store 245, located in the rendering device memory 165, or in another local memory (not shown). Examples of page data that can be stored in the Renderer Data Store 245 are source images, source fills and text data. In one SDS arrangement, the Renderer Data Store 245 comprises an Image Store 246 and a Text Store 247.

During the Data Extraction process 210, additional information may be required from the Cloud Server 120. The Data Extraction process 210 obtains this information by querying, as depicted by an arrow 204 over the network 170 and the respective connections 102, 101, Font and Image Information 221 available to the SDS Cloud Program 130 running on the Cloud Server 120. This information is can be used either in the formation of the extracted data 224, or else to determine if data should be copied from the incoming page data 205. Thus, for example, a step 530 in FIG. 5 retrieves font information such as bounding boxes and advance vectors from the Cloud Server 120. In another example, by querying the Cloud Server 221, a step 440 in FIG. 4 may determine that a required image colour space conversion can be performed using ancillary data formed by the Cloud Server 120, and hence that the source image data can be extracted and stored locally.

Portions of the page data in the PDL file 205 can be identified by the step 210 as being either "secure" or "non-secure". In one SDS arrangement, the identification is made by looking up an attribute table based on the type of page data.

Figure 23:
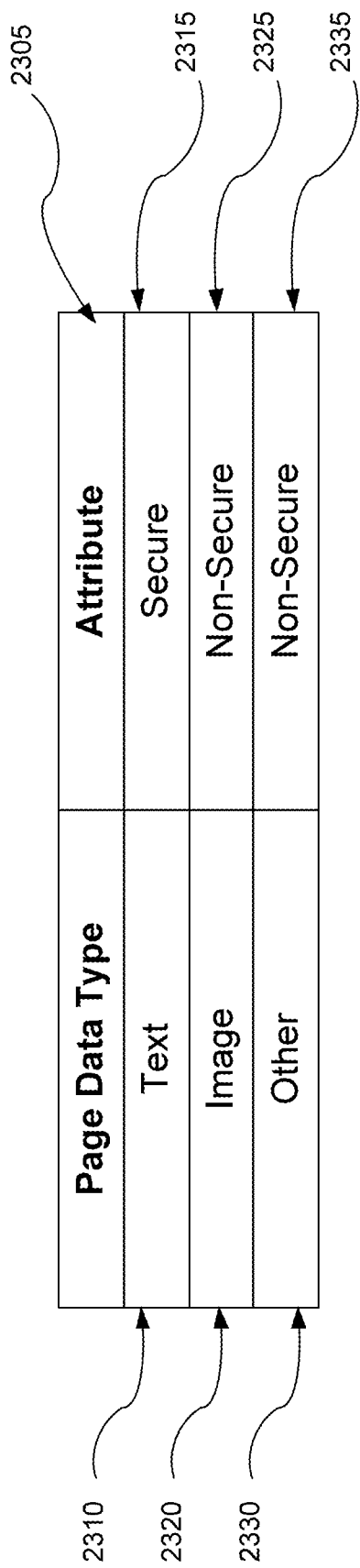
FIG. 23 is an exemplary attribute table on which the examples of the SDS arrangement may be practised.

FIG. 23 shows an example of an attribute table 2305. It can be seen that in the example attribute table (ie 2305) Text Data (ie 2310) is marked as "Secure" (ie 2315), Image Data (ie 2320) is marked as "Non-Secure" (ie 2325), and all Other Data Types (ie 2330) are marked as "Non-Secure" (ie 2335). Page data identified as Secure data cannot be transmitted to the SDS Cloud Program 130 in any format which allows the original data to be reconstructed, while page data which is non-secure data can be transmitted to the SDS Cloud Program 130 running on the Cloud Server 120. The SDS arrangement can identify other types of data in the page data in the PDL file, such as high-bandwidth data or high-quality data which must be preserved losslessly, and depending upon the attributes of these types of data, can decide which data can be transmitted to the cloud server 120 and which data should not be transmitted to the cloud server 120.

In one SDS arrangement, text data in the incoming page data 205 is identified as being secure, while image data is marked as non-secure. This ensures that confidential text information will not be sent to the server 120, while image data can be sent to the server 120 if required. In an alternative SDS arrangement, image data can be marked as secure, however this means that any processing that needs to be done on the image must be supported on and performed by the rendering device 135 as a printer. If any processing operation, for example decompressing the native image format or colour space conversion, is not supported on the rendering device 135 as a printer, the page will not be rendered correctly. In a further alternative SDS arrangement, text data can be marked as non-secure. This will allow all of the semantic text data contained in the page data to be transmitted to the cloud server 120. The Data Extraction process 210 is described in more detail below.

Once the SDS controlling program 145 has completed the Data Extraction process 210, the process 200 then moves, as depicted by an arrow 202, to a Page Modification process 215. The Page Modification process 215 modifies the Input PDL File 205 by removing all of the data 224 that has been copied from the Input PDL File by the data extraction process 210, and inserting, into the Input PDL file 205, references to the copied Data 224 that was copied in the Data Extraction process 210 and stored in the Renderer Data Store 245, thereby substituting the references to the copied data for the data which has been copied. The Page Modification process 215 produces a Modified PDL File 217 containing altered page data. The Page Modification process 215 will be described hereinafter in more detail below with reference to FIGS. 6 through 11.

Once the Modified PDL File has been produced by the Page Modification process 215, the process 200 follows an arrow 206 to a PDL Transmission process 220. The PDL Transmission process 220 sends, as depicted by an arrow 207, the Modified PDL File 217 to the SDS Cloud Program 130 executing in the Cloud Processor 130 of the Cloud Server 120 via the connections 102, 101 over the Internet 170.

Once the SDS Cloud Program 130 running on the Cloud Server 120 has received the Modified PDL File 217, the cloud program 130 processes the Modified PDL File 217 using a Conversion to Intermediate Format process 225. This process 225 produces an Intermediate Format File 218, comprising a fillmap and a table of fill compositing sequences. The table of fill compositing sequences contains references to the copied data 224 stored in the Renderer Data Store 245 in the rendering device 135. The fillmap and the table of fill compositing sequences are described hereinafter in more detail below in regard to FIG. 13 and FIG. 14.

During creation of the Intermediate Format File 218, the SDS Cloud Program 130 may need to render some part of the Modified PDL File to pixels to avoid exceeding memory limitations or other system limitations in either the server 120 or the rendering device 135. In this case it may be necessary for the Cloud Server to request and access, as depicted by an arrow 290, data that is stored in the Renderer Data Store 245. There are constraints on which data may be transmitted from the rendering device 135 to the cloud server 120. Thus, in one example, only data that is not marked as secure can be transmitted from the Renderer Data Store 245 to the SDS Cloud Program 130. If data that is marked as secure is required to render the Modified PDL to pixels, the SDS Cloud Program 130 will return an error to the rendering device 135 and the controlling program 145 will exit.

After the Intermediate Format File 218 consisting of the fillmap and table of fill compositing sequences have been produced, the process 200 moves, as depicted by an arrow 208, to an Ancillary Data Generation process 230. The Ancillary Data Generation process 230 produces Ancillary Data 222 that will be used by the rendering device 135 to process the copied data 224 stored in the Renderer Data Store 245 during a Data Conversion Process 240. The Ancillary Data 222 may include colour space conversion information and font information. The Ancillary Data Generation process 230 will be described hereinafter in further detail below.

Once the Ancillary Data 222 has been produced, the process 200 proceeds, as depicted by an arrow 209, to an Intermediate Format Transmission process 235. The Intermediate Format Transmission process 235 sends, as depicted by an arrow 211, an Intermediate Format Transmission File 223 consisting of the Intermediate Format File 218 (ie the fillmap and the table of fill compositing sequences), together with the Ancillary Data 222, to the rendering device 135 via the Internet 170.

Once the rendering device 135 (a) receives, as depicted by the arrow 211, the Intermediate Format File 218 and the Ancillary Data 222, and (b) receives, as depicted by an arrow 212, the copied data 224 that had been stored in the renderer data store 245, the rendering device 135 combines the Ancillary Data 222 with the extracted data 224 stored in the Renderer Data Store 245, in a Data Conversion process 240. The Data Conversion process 240 ensures that the extracted data 224 is in form that can be rendered. This means that the extracted data is formatted so that it can be used by the pixel rendering apparatus 160 to render the Intermediate Format File 218. For example if the Ancillary Data 222 included a set of colour space conversion instructions to be used with an image stored in the Renderer Data Store 245, the colour space conversion would be applied to the image. This would result in an image that was in the correct colour space for rendering. The Data Conversion process 240 will be described hereinafter in further detail below in regard to FIG. 19.

Once the extracted data 224 has been formatted by the process 240, the process 200 follows an arrow 213 to a Data Incorporation process 248. The Data Incorporation process 248 replaces the references in the Intermediate Format File 218 with the extracted data associated with the references. This produces a Renderable Intermediate Format File 219. The Data Incorporation process 248 is discussed hereinafter in further detail in regard to FIGS. 20 and 21.

Once the Renderable Intermediate Format File 219 has been produced, the process 200 follows an arrow 214 to an Intermediate Format Rendering process 250 in which the pixel rendering apparatus 160 uses the updated fillmap and table of fill compositing sequences (ie the Renderable Intermediate Format File 219) to render the page data to pixels 226. The output of the pixel rendering apparatus 160 is pixel data 226, which may be used by the printer engine 155 to render the page data to a document page 156 on a physical print medium or a display.

The Data Extraction process 210 is used to copy source page data from the Input PDL File 205, the copied source page data 224 being stored locally in the Renderer Data Store 245. In a preferred SDS arrangement, the source copied source page data 224 which is copied from the Input PDL File 205 consists of source image data and text data. The page modification process 215 removes the data that is copied by the extraction process 210 from the Input PDL File 205 thus reducing the size of the file 217 that needs to be sent to the SDS Cloud Program 130 running on the Cloud Server 120. Extracting text data from the Input PDL File 205 means that the cloud server 120 does not have access to the text content of the Input PDL File 205. Note that image data in the PDL file 205 is typically marked as non-secure, meaning that if required it can be transmitted to the Cloud Server 120, whilst text data is typically marked as secure, meaning that it cannot be sent to the Cloud Server 120.

Figure 3:
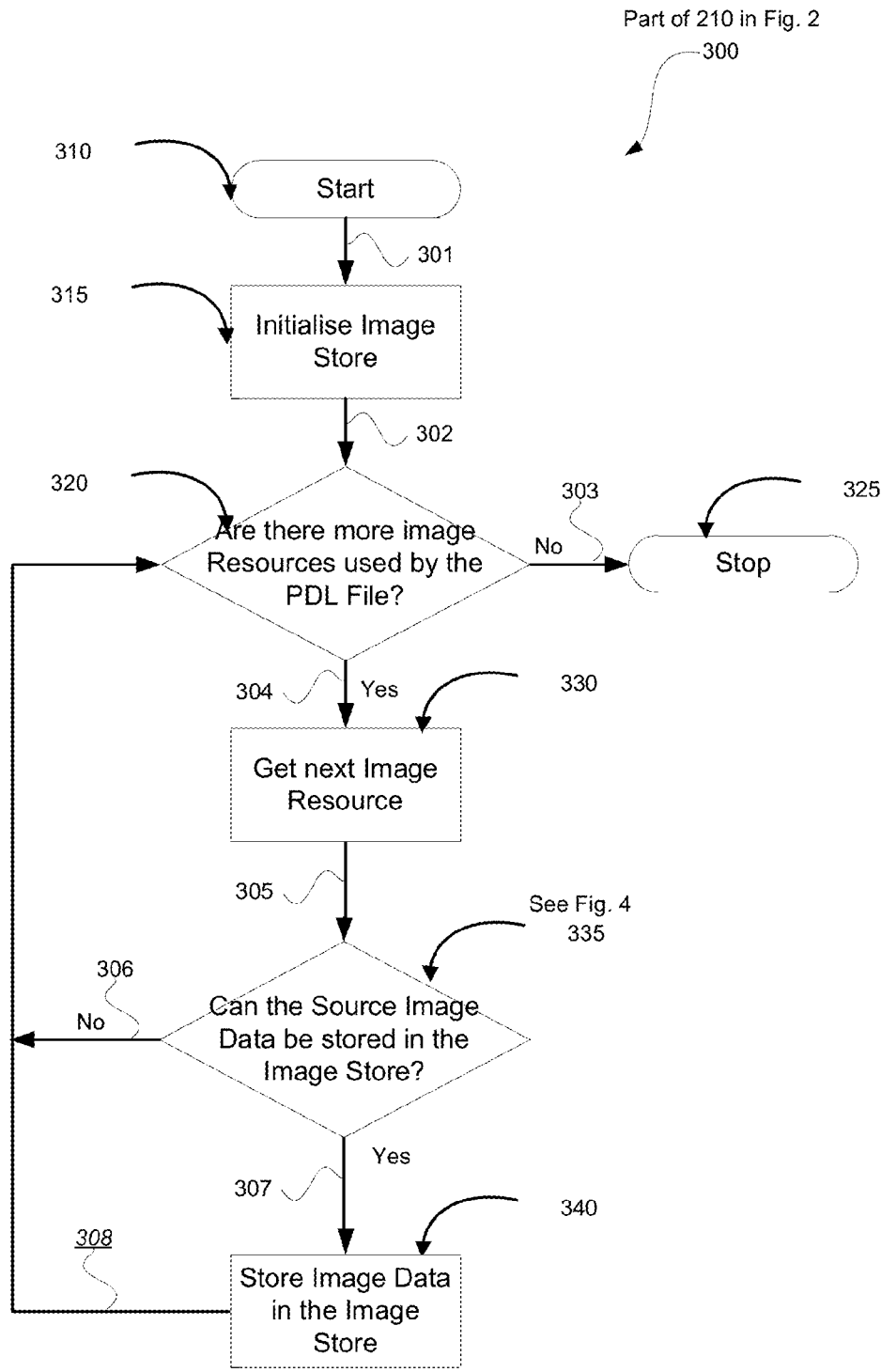
FIG. 3 is a schematic flow diagram illustrating a method of extracting image resources according to one example of the SDS arrangement.

FIG. 3 is a sequential flow diagram showing a process 300 for extraction of source image data, used to copy Image Data from the Input PDL File 205 as part of the Data Extraction Process 210 performed by the rendering device 135. The source image extraction process 300 copies source image data, this being part of the source page data, from the Input PDL File 205 and stores this data in an Image Store 246 located in the Renderer Data Store 245. The source image data forms part of the copied data 224.

The process 300 starts at a step 310. The process 300 then follows an arrow 301 to a following step 315, in which the Image Store 246 in the Render Data Store 245 is initialised by the processor 140. The Image Store 246 is used to store the source image data copied from the Input PDL File 205. The process 300 then follows an arrow 302 to step 320 in which the processor 140 under the direction of the SDS controlling program 145, determines if the Input PDL File contains any source image data that has not yet been processed. If it is determined in the step 320 that there is no source image data that has not yet been processed, the Source Image Extraction process 300 follows a NO arrow 303 and terminates at a Step 325.

If it is determined in the Step 320 that there exists further source image data to process, the process 300 then follows a YES arrow 304 to a Step 330, in which the processor 140 under the direction of the controlling program 145 obtains the next source image to copy from the input PDL file 205.

In one SDS arrangement using a PDF format input file, the process 330 can be implemented by traversing a page tree associated with the document in question to find any relevant pages, and for those pages to traverse the associated resource dictionaries to find all image XObject resources that can be used to render the file. This may require a recursive traversal of any form XObject resources. PDF Image Resources consist of the source pixel data, which may or may not be compressed, together with the image resource colour space. The storage colour space for the image can be determined from the parent transparency group XObjects or page group colour space. Similar techniques can be used to obtain source images from files using other PDL formats.

Once the source image has been obtained by the process 330, the process 300 then follows an arrow 305 to a Step 335, in which the processor 140 determines if the source image retrieved by the process 330 can be stored in the Image Store 246 in the Renderer Data Store 245. The determining process used in the Step 335 is described hereinafter in further detail below in regard to FIG. 4.

If the step 335 determines that the source image cannot be stored in the Image Store 246, processing follows a NO arrow 306 and returns to the Step 320. If the source image can be stored in the Image Store 246, processing follows a YES arrow 307 and proceeds to a Step 340. In the Step 340 the source image is stored in the Image Store 246. The process 300 then follows an arrow 308 back to the step 320.

Figure 4:
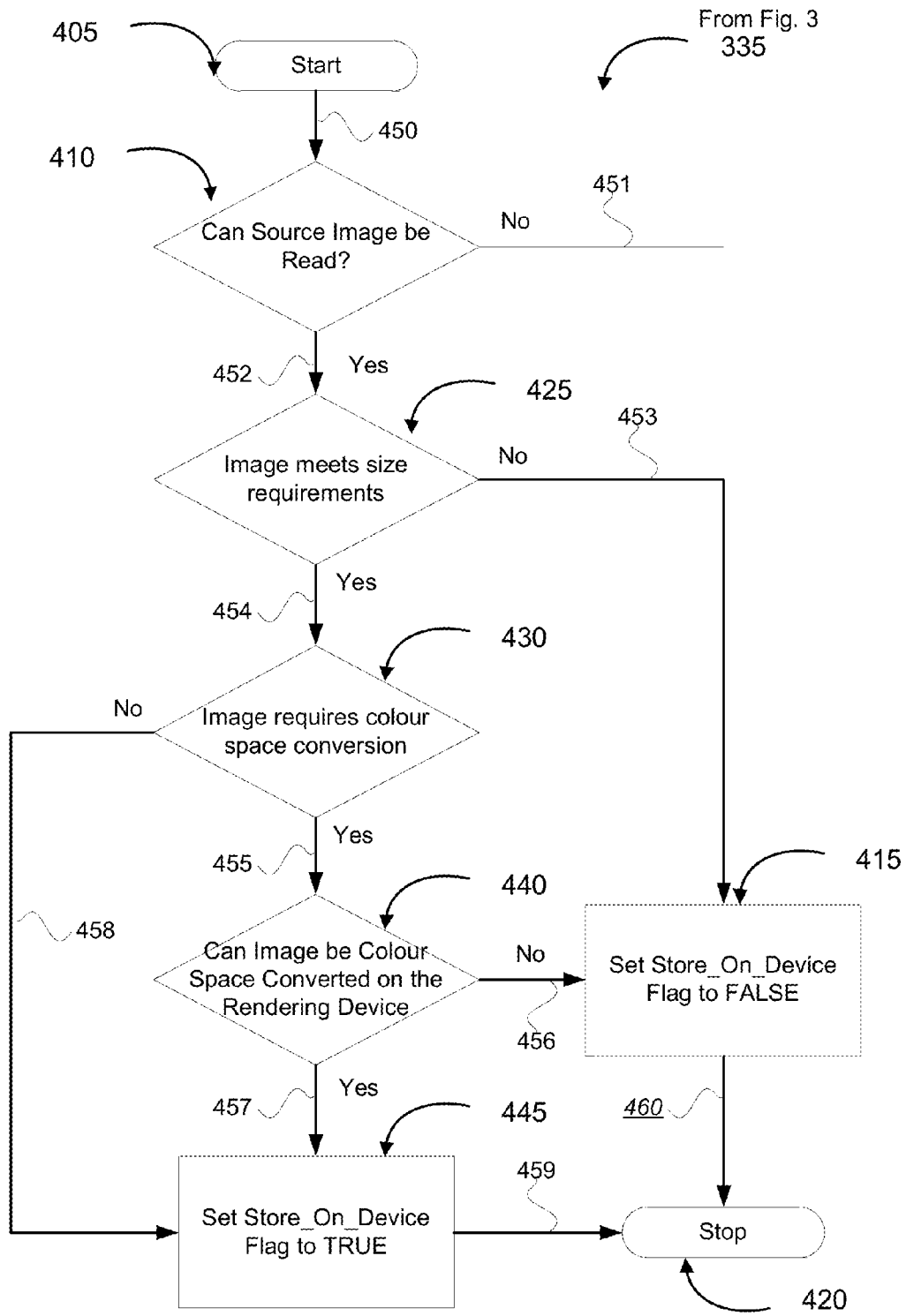
FIG. 4 is a schematic flow diagram illustrating a method of determining whether an image resource should be extracted according to one example of the SDS arrangement.

FIG. 4 is a sequential flow diagram depicting the Source Image Storage Determining sub-process 335 (see FIG. 3) in more detail. Processing starts at a step 405 and then follows an arrow 450 to a Step 410, where the processor 140 determines if the source image data in the file 205 is in a format that can be read by the SDS Controlling Program 145. In one SDS example, if the source image uses a compression format that is unknown to the SDS Controlling Program 145, the source image cannot be read by the SDS Controlling Program 145 and cannot be stored within the Image Store 246. Any unreadable images are sent, as depicted by the arrow 207 in FIG. 2 to the Cloud Server 130, which may decompress the image and re-encode it in a format suitable for rendering on the rendering device 135. This can be done during the Conversion to Intermediate Format process 225. One possible method of determining whether an image is to have a list of supported image formats within the Font and Image Information 221 on the Cloud Server 130 follows. The format of the source image will be specified by the input PDL File 205, and the SDS Controlling Program 145 can interrogate the list of supported formats during the Data Extraction Process 210 to determine if a particular source image is in a readable format. Similarly, during the Conversion to Intermediate Format process 225, the Cloud Server can interrogate the list to determine an appropriate format to use to re-encode the image.

If it is determined by the step 410 that the source image data cannot be read by the Controlling Program 145, processing follows a NO arrow 451 to a Step 415. In the Step 415, a STORE_ON_DEVICE flag is set to FALSE by the processor 140. Setting the STORE_ON_DEVICE flag to FALSE indicates to the Source Image Extraction sub-process 335 that the source image cannot be stored in the Image Store 246. The Source Image Storage Determining sub-process 335 then follows an arrow 460 and terminates at a step 420.

Alternatively, if it is determined in the Step 410 that the source image can be read by the SDS Controlling Program 145, processing follows a YES arrow 452 and continues to a Step 425, where the processor 140 determines whether or not the source image meets the size requirement for storage in the Image Store 246. In one SDS arrangement, source image data is only added to the Image Store 246 if it is larger than a pre-determined minimum size. This is because it is often more efficient to send small images to the cloud server 120 rather than extract them and store them locally in the Image Store 246. If it is determined that the source image is smaller than the predetermined minimum size, processing follows a NO arrow 453 and moves to the Step 415, described above.

Alternatively, if it is determined in the step 425 that the source image data is larger than the predetermined minimum size, processing follows a YES arrow 454 and moves to a Step 430, in which the processor 140 determines if the image requires colour space conversion. An image will require colour space conversion if the colour space in which the source image is provided in the file 205 is not the same as the colour space used by the 135 to render the image. If it is determined that the image does not need colour space conversion, that is the colour space in which the source image is provided in the file 205 is the same as the colour space used by the rendering device 135 to render the image, processing follows a NO arrow 458 and proceeds to a Step 445. In the Step 445, the STORE_ON_DEVICE flag is set to TRUE. Setting the STORE_ON_DEVICE flag to TRUE indicates to the Source Image Extraction sub-process 335 that the source image can be stored in the Image Store 246. The Source Image Storage Determining sub-process 335 then follows an arrow 459 and terminates at the step 420.

Alternatively, if it is determined in the Step 430 that the source image does need colour space conversion, processing follows a YES arrow 455 and continues to a Step 440, in which the processor 140 determines whether or not the colour space conversion can be performed by the SDS controlling program 145 on the rendering device 135. A colour space conversion can be performed by the SDS controlling program 145 if the controlling program 145 has colour space conversion software capable of performing the colour space conversion, or if the SDS Cloud Program 130 running on the Cloud Server 120 can create colour space conversion data which the SDS controlling program 145 running on the rendering device 135 can use to colour space convert the image. If colour space conversion software is present in the SDS controlling program 145, the controlling program 145 will examine the image colour space and the storage colour space to determine if the colour space conversion can be performed by the aforementioned colour space conversion software. If the colour space conversion cannot be performed, or if there is no colour space conversion software present on the rendering device, the controlling program 145 may contact the Cloud Server as depicted by the arrow 204 in FIG. 2 via the Internet 170 to determine if the Cloud Program 130 is capable of creating colour space conversion data for the image. The rendering device 135 provides the Cloud Program 130 with colour space information for both the source image and the colour space that is to be used by the rendering device 135 to render the source image. The Cloud Program 130 responds by indicating whether or not it can create colour space conversion data for the source image.

If the controlling program 145 is incapable of performing the colour space conversion, and the Cloud Program 130 is incapable of creating colour space conversion data for the image, the Step 440 concludes that the image cannot be colour space converted. In this case processing follows a NO arrow 456 and proceeds from the Step 440 to the Step 415, described above. Alternatively, if either the controlling program 145 is capable of performing the colour space conversion or the Cloud Program 130 can create colour space conversion data for the image, the Step 440 concludes that the image can be colour space converted on the controlling program 145. The Source Image Storage Determining sub-process 335 then follows a YES arrow 457 to the step 445 and then follows an arrow 459 and terminates at the step 420.

Returning to FIG. 3, it can be seen that once controlling program 145 determines that an image can be stored in the Image Store 246 in the Step 335, processing follows the YES arrow 307 and continues to the Step 340, where the source image is stored in the Image Store 246. In the preferred SDS arrangement, the source image in the input PDL file 205 is stored by applying a decompression operation to it, thereby decompressing it to raw pixel values, and applying to the raw pixel values any necessary colour space conversion that can be performed by the SDS controlling program 145. The Image Data can then be compressed and stored in the Image Store 246. Alternatively, if the source image is compressed, and the image compression format is compatible with the data formats used by the Image Store 246, and no colour space conversion by the controlling program 145 is required, the compressed source image can be copied directly into the Image Store 246. Each image stored in the Image Store 246 is provided with a unique image ID, which is subsequently used in the Modification Process 215.

Figure 5:
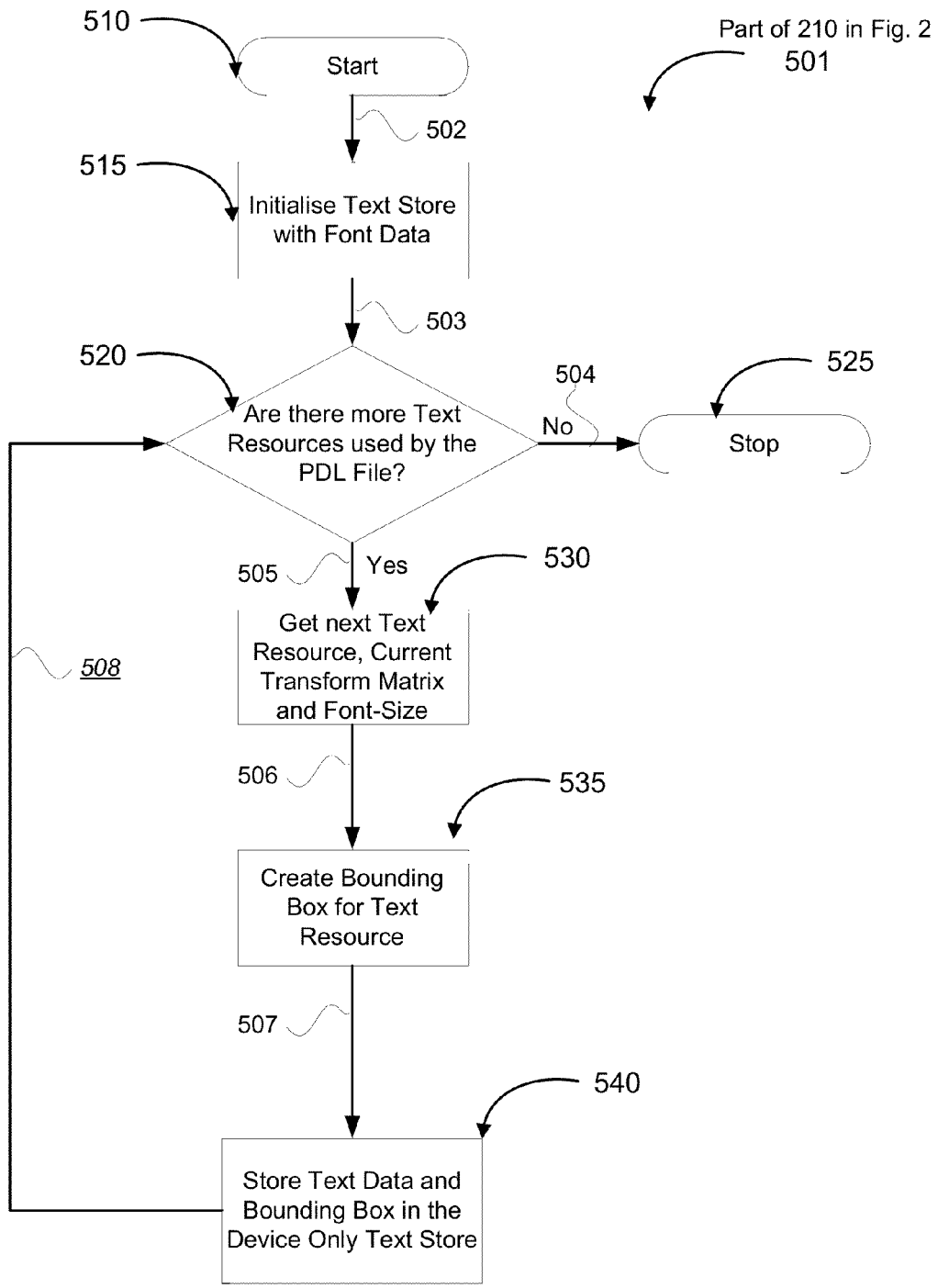
FIG. 5 is a schematic flow diagram illustrating a method of extracting text resources according to one example of the SDS arrangement.

FIG. 5 is a sequential flow diagram showing a Source Text Extraction sub-process 501, used to copy text data from the Input PDL File 205 as part of the Data Extraction Process 210. The Source Text Extraction sub-process 501 copies source text data from the Input PDL File 205 and stores this data in the Text Store 247 located in the Renderer Data Store 245. The process 501 starts at a step 510 and follows an arrow 502 to a Step 515, where the Text Store 247 is initialised by the processor 140. Processing then follows an arrow 503 and moves to a Step 520, in which the processor 140 determines whether or not the Input PDL File 205 contains any Source Text Resources that have not yet been processed. If it is determined in the Step 520 that there are no Source Text Resources that have not yet been processed, the Source Text Extraction sub-process 501 follows a NO arrow 504 and terminates at a Step 525.

If it is determined in the Step 520 that there are further Source Text Resources to process, processing follows a YES arrow 505 and moves to a Step 530, in which the processor 140 obtains the next Source Text Resource, together with the transform, if one is present, which is used to place, scale and rotate the text on the page. Once this information has been obtained by the step 530, processing follows an arrow 506 and moves to a Step 535, in which the SDS Controlling Program 145 creates page data defining a Bounding Box for the Text Resource. Once the page data for the bounding box has been created, processing follows an arrow 507 and moves to a Step 540, which stores the Text Data together with the Bounding Box information in the Text Store 247. The Controlling Program 145 associates the text resource in the PDL File with the Text Data stored in the Text Data Store 247. In a preferred SDS arrangement, the Controlling Program 145 does this by recording the file location of the text resource in the PDL file 205, and stores this file location together with the Text Data in the Text Data Store 247.

One implementation of the Source Text Extraction sub-process 530 in which the PDL 205 is a PDF format input file is described as follows. First, after the Text Store 247 is initialised, a page tree of the PDF input file is traversed to find any relevant pages, and for those pages the resource dictionaries for the page and all the XObjects used on the page are traversed to obtain all fonts used during rendering. An example font is Helvetica. For each font that is used on the page, the font identifier is stored in the Text Store 247, together with the bounding box and advance vector information for the font at a default font size. The default font size used in this arrangement is 1 point. This bounding box and advance vector information may either be a single, maximum bounding box and advance vector for the font, a bounding box and advance vector for each character in the font, or some combination thereof where specific bounding boxes and advance vectors are given for some characters in the font, while a maximum bounding box and advance vector is used for all other characters. The bounding boxes and advance vectors for the font are obtained by querying the Font Information 221 available to the Cloud Program 130 running on the Cloud Server 120. In an alternative arrangement, the font information is not added to the Text Store 247 when the Text Store 247 is initialised in Step 515, but instead this is done in Step 530, when each Text Resource is obtained. If the current font for the obtained Text Resource is not present in the Text Store 247, the Text Store Data is updated with the new font.

Once Source Text data has been added to the Text Store 247, the processor 140 begins to parse the content stream of the PDF File 205. During parsing, the processor 140 keeps track of the current transform matrix, used to place the Text Resource onto the page. In PDF the transform matrix can be altered by either a command to change the matrix, by a change in the PDF graphics state, or by a specific Text matrix command, which alters the matrix for the current text only. The Controlling Program 145 also records the current font and font-size being used. In PDF the font and font-size can be altered by a specific font instruction. Then for each individual paint string instruction, the processor 140 obtains the text string and starting position for each Text Resource.

Once the Text Resource is obtained, the bounding box and advance vector information stored in the Text Store 247 can be used to create a bounding box for the Text Resource. This bounding box is then multiplied by the current transform and scaled by the font-size used to draw the Text Resource, to obtain the final bounding box for the Text Resource as painted on the page. This final bounding box, together with the text string, font and font-size used to draw the text, is then stored in the Text Store 247.

Returning to FIG. 2, once the Data Extraction process 210 is complete, processing then moves to the Page Modification process 215. In this process the Text and Image Resources that were copied from the input file 205 and stored in the Renderer Data Store 245 are removed from the PDL File 205 and replaced by references to the stored data. This may require the Controlling Program 145 to modify parts of the Input PDL File 205, or else the Controlling Program 145 may completely rewrite the PDL File.

In order to refer to external data, if a given PDL format supports references to external text or image data, the references to the stored data may be inserted into the PDL File using the appropriate standard format. Alternatively custom tags may be inserted into the PDL File. Two example methods of inserting references to image data, and one example method of inserting references to text data using the PDF Format will be shown below.

Consider an Example PDF File 610 shown in FIG. 6. The PDF File 610 contains a single image object 620, whose image data is contained within an XObject stream 630.

Figure 7:
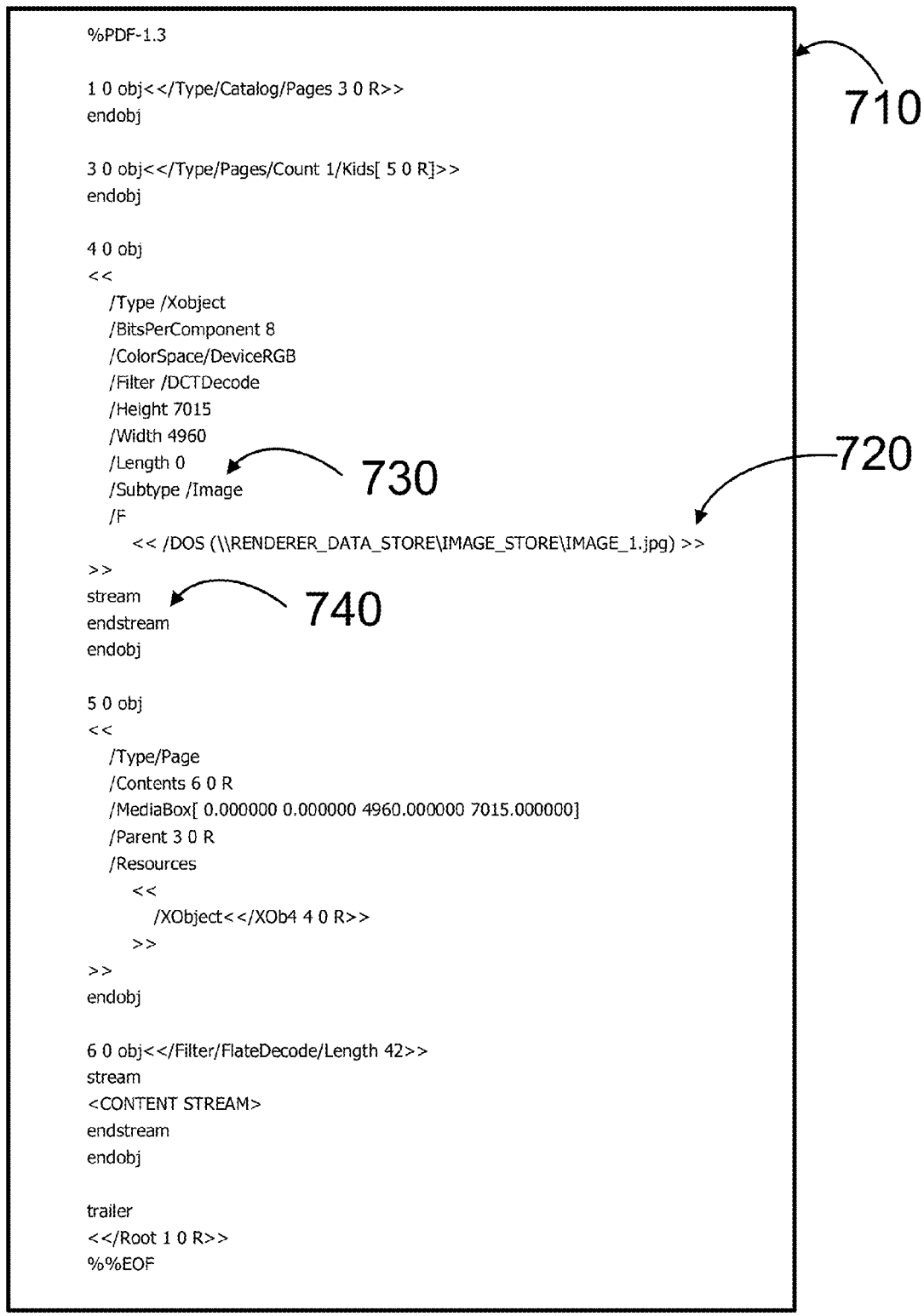
FIG. 7 shows a Modified PDL File which has been modified according to one example of the SDS arrangement.

A first example implementation of source image copying, storage and modification by the steps 210 and 215 is shown in modified PDF file 710 of FIG. 7 (also see modified file 217 in FIG. 2). The SDS arrangement uses the standard PDF Format to insert a reference 720 to an External File into the modified PDF file 710. The external file is a Stored Image in the Image Store 246 located in the Renderer Data Store 245. Note that both a /Length Field 730 in the image XObject and the XObject's stream 740 have also been modified. This modified PDF 710 conforms to the PDF Standard, and can be rendered by any PDF renderer that supports external images and has access to the image stored in the Renderer Data Store 245.

A second example of source image copying, storage and modification by the steps 210 and 215 is shown in modified PDF File 810 of FIG. 8. The SDS arrangement inserts a proprietary tag 820 added to the image's XObject, which contains a reference to the stored image. The XObject's stream has been altered to contain a Run Length Encoded image 840, which has only a single colour. A single colour is used in this example as it will compress efficiently. Note that both the /Filter Field 830 and the /Length Field 850 in the image XObject have also been modified. This modified PDF conforms to the PDF Standard, and can be rendered by any PDF renderer. However, the single-colour image will appear rather than the extracted image.

Figure 10:
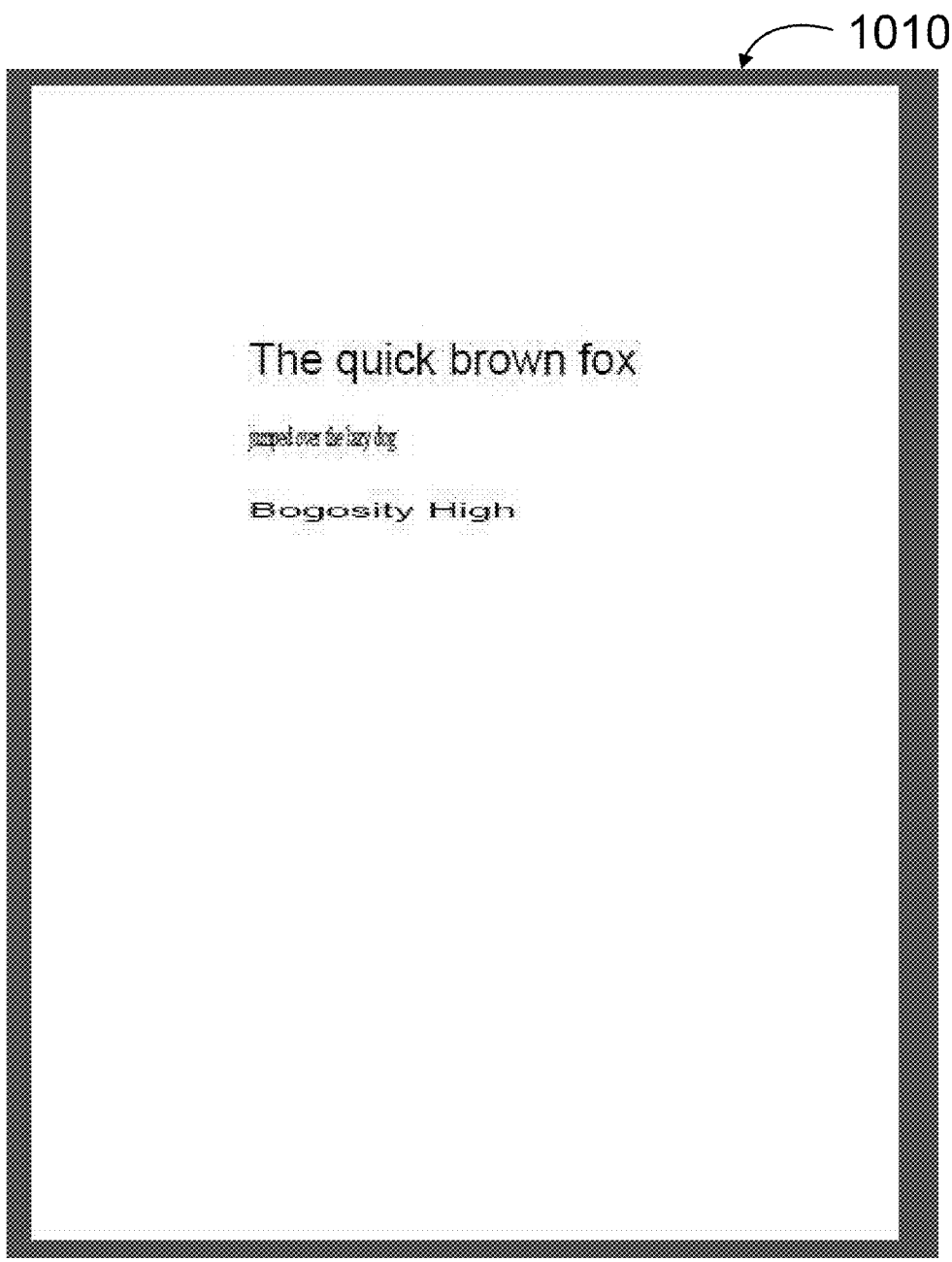
FIG. 10 shows output for the Input PDL File shown in FIG. 9.

Consider now the example modified PDF file 910 shown in FIG. 9. The PDF File uses two fonts, F13 and F14, outlined in Resource 3 0 obj (ie 920), which reference Resource 6 0 obj (ie 930) and 7 0 obj (ie 940) respectively. Resource 6 0 obj 930 is the Helvetica Font, while Resource 7 0 obj 940 is the Times-Roman Font. The PDF contains a single Object which draws text, namely 5 0 obj (ie 950). Object 6 0 obj 950 contains a content stream which draws three strings. The first string 960 is drawn using F13 (Helvetica) font at size 30 with the transform matrix 1 0 0 1 150 600, and draws the string "The quick brown fox" (see FIG. 10). The second string 970 is drawn using F14 (Times-Roman) font at size 10 with the transform matrix 1 0 0 2 150 550, and draws the string "jumped over the lazy dog" (see FIG. 10). The third string 980 is drawn using F13 (Helvetica) font at size 15 with the transform matrix 2 0 0 1 150 500, and draws the string "Bogosity High" (see FIG. 10). The output 1010 for this PDF File is shown in FIG. 10.

A first example implementation of Text copying, storage and modification by the steps 210 and 215 is shown in modified PDF file 1110 of FIG. 11. The SDS arrangement replaces each text string in the Object 5 0 obj content stream 1120 with (a) a proprietary tag containing a reference to the string stored in the Renderer Data Store 245 and (b) a Bounding Box (1130, 1140 and 1150) which contains a reference to the stored text. Proprietary tags (1160, 1170, 1180) have also been inserted into the Font Resource Objects. Each of these tags indicates a font-size that is used on the page, and a glyph list required for the font/font-size pair. This glyph list must contain only the glyphs used on the page. For example, if a large number of glyphs is required, the glyph list may simply request all of the glyphs in the font. Alternatively, if few glyphs are used it might be possible to reconstruct the original string from the glyph list, additional glyphs may be included in the glyph set to enhance security. Thus, data with certain security attributes is not sent to the cloud server 120. This data, which has a "confidential" attribute, is stored on the rendering device as a printer while the rest of the document is sent to the cloud for processing.

When the modified PDL File 217 is received by the Cloud Program 130 running on the Cloud Server 120, the Cloud program 130 converts the Modified PDL File into an Intermediate Format File 218. The current example of the SDS arrangement uses the Tiled Fillmap Format as the intermediate format. The Tiled Fillmap Format will be described in detail in the following section.

Figure 12:
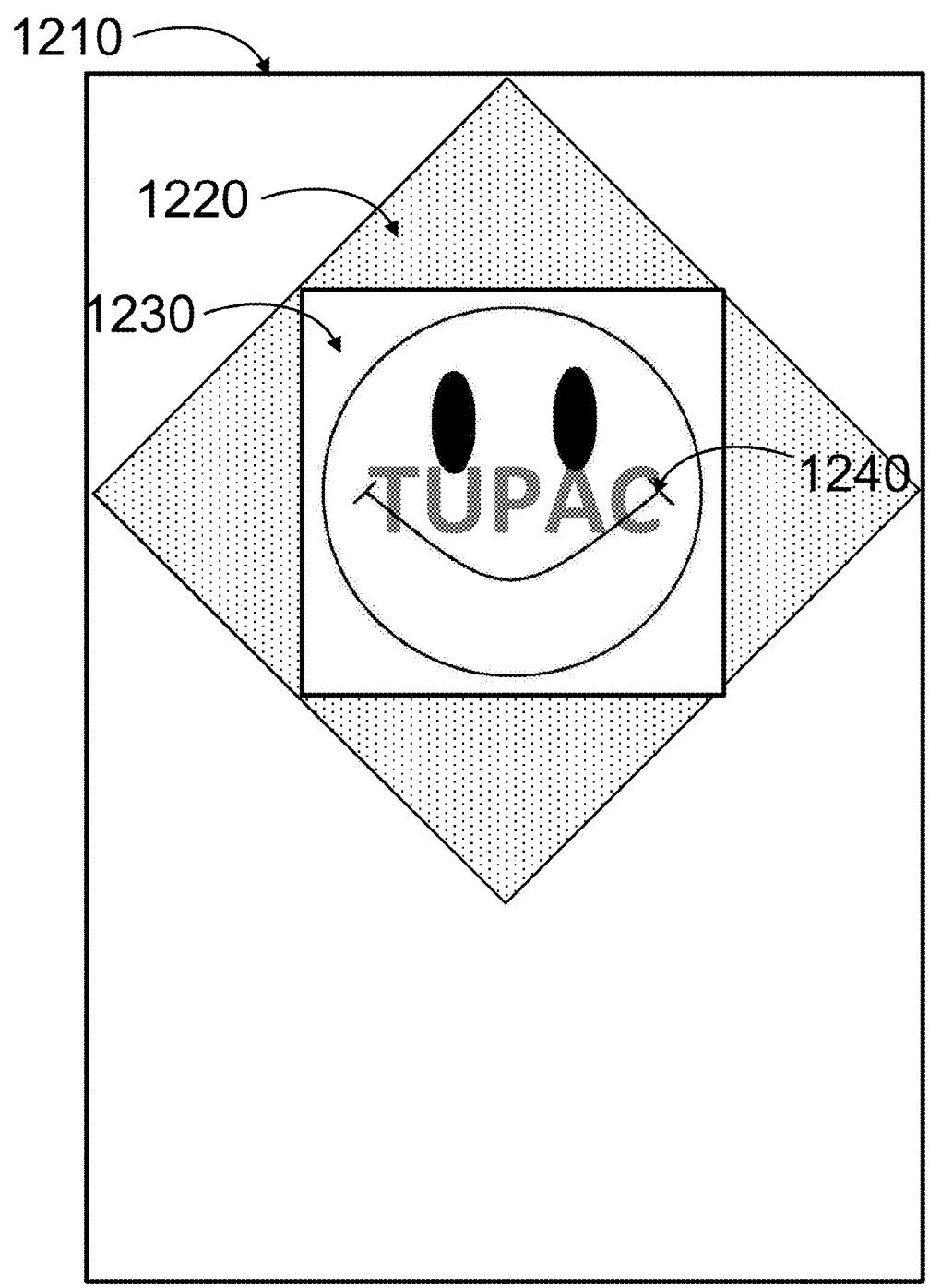
FIG. 12 shows an exemplary page on which the process of fillmap generation will be illustrated.

FIG. 12 shows an example of a page 1210 containing three objects. A bottom layer object 1220 is an opaque diamond, a second from bottom layer object 1230 is an opaque bitmap, and the top layer object 1240 is a semi-transparent text string "TUPAC". Before describing how a tiled fillmap representation of the example page 1210 is constructed in relation to FIG. 13, a brief description of fillmaps is provided.

A fillmap is a region-based representation of a page. A fillmap maps a region within the page to a fill compositing sequence which can be used to generate the colour of each pixel within that region. Therefore all pixels within the region can be said to map to the fill compositing sequence associated with that region. Multiple regions within a fillmap can map to the same fill compositing sequence. Regions within the fillmap are disjoint, i.e., the regions do not overlap, and hence each pixel in the rendered page can only belong to a single region. Each region within the fillmap is defined by a set of pixel-accurate fillmap edges which mark region boundaries. In the preferred embodiment, the fill compositing sequence pertaining to a region is associated with the edge that marks the left-hand (minimum x) boundary of the region. A fillmap page representation can be efficiently compressed. An example compression method would be to represent the edges as a set of x-offsets and subsequently compress the x-offsets using entropy encoding. One well-known method of entropy encoding is Huffman encoding. Fillmap compression will lower the bandwidth and transmission time required to transmit the fillmap. A fillmap is simpler to render than a PDL page representation, as scan conversion has been performed to produce the fillmap.

A page is converted to a fillmap by scan converting the graphical objects, and, for each scanline, determining a set of fill compositing sequence runs for the scanline. The position of a Fillmap Edge at a scanline is the x-position where the corresponding fill-compositing sequence run begins. Edges can be combined between scanlines if they activate the same fill compositing sequence and they meet an edge extension condition. An example edge extension condition is if the fill compositing sequence run activated by an edge a first scanline overlaps or abuts the fill compositing sequence run activated by an edge in the subsequent scanline. This example edge extension condition is illustrated in FIGS. 25A-25H. In FIGS. 25A-25H a pixel span 2500, bounded by the fillmap edges 2510 and 2520, is shown on the previous scanline 2530. A fill compositing sequence run 2540 bounded by a pixel boundary 2550 is shown on the current scanline 2560. The edge extension condition is satisfied by the pixel boundary 2500 in the scenarios illustrated in FIGS. 25A-25F, where the fill compositing sequence run 2540 overlaps or abuts the pixel span 2500. In the scenarios illustrated in FIGS. 25G and 25H the pixel boundary 2550 does not satisfy the edge extension condition as the fill compositing sequence run 2540 does not overlap or abut the pixel span 2500. If the edge extension condition is met, and the two edges activate the same fill compositing sequence, then the two edges can be combined into a single fillmap edge. Otherwise two fillmap edges are created.

Figure 13:
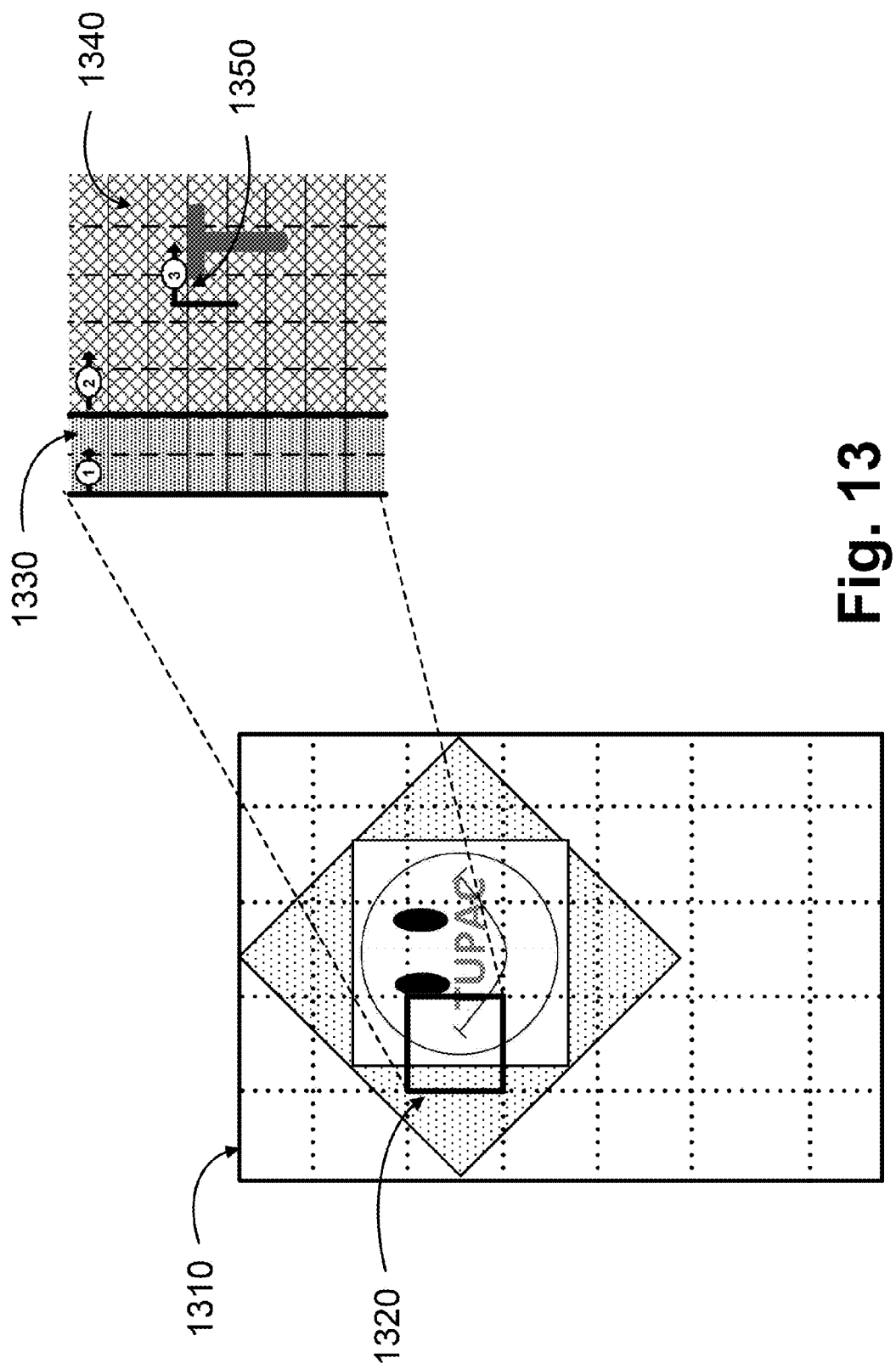
FIG. 13 shows a Tiled Fillmap intermediate representation for the exemplary page shown in FIG. 12.

FIG. 13 illustrates a Tiled Fillmap representation 1310 of the example page 1210. The Fillmap tile 1320 is at position (1, 2) expressed in (column, row) form. The contents of the fillmap tile 1320 are shown in expanded format on the right hand side of FIG. 13. Three regions 1330, 1340 and 1350 in the fillmap tile 1320 reference fill compositing sequences with indices one, two and three respectively.

Figure 14:
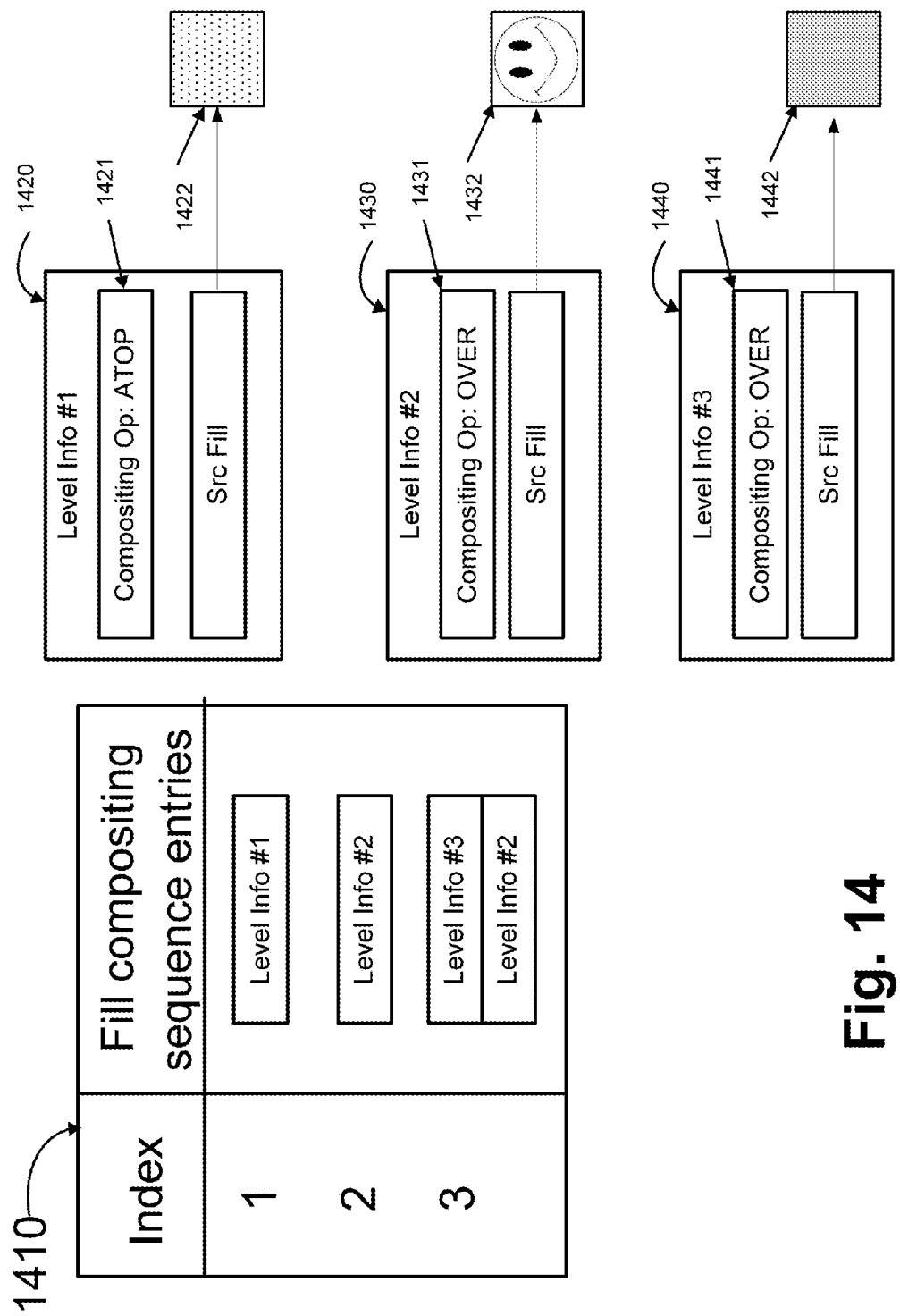
FIG. 14 shows the table of fill compositing sequences and corresponding Level Information for the Tiled Fillmap intermediate representation shown in FIG. 13.

FIG. 14 shows a table of fill compositing sequences 1410 and corresponding Level Information 1420, 1430, 1440 for the Tiled Fillmap 1310. Level Info #1 (ie 1420) contains rendering information corresponding to the opaque diamond object 1220. Level Info #1 (ie 1420) references the linear blend fill 1422 used to fill the opaque diamond 1220, and contains the compositing operator ATOP (ie 1421). Level Info #2 (ie 1430) contains the rendering information corresponding to the opaque low resolution source bitmap object 1230. Level Info #2 (ie 1430) references the low-resolution bitmap source fill 1432, and has the compositing operator OVER 1431. Level Info #3 (ie 1040) contains the rendering information corresponding to the semi-transparent text object 1240. Level Info #3 (ie 1440) references a flat grey source fill 1442, and has the compositing operator OVER 1441.

Figure 15:
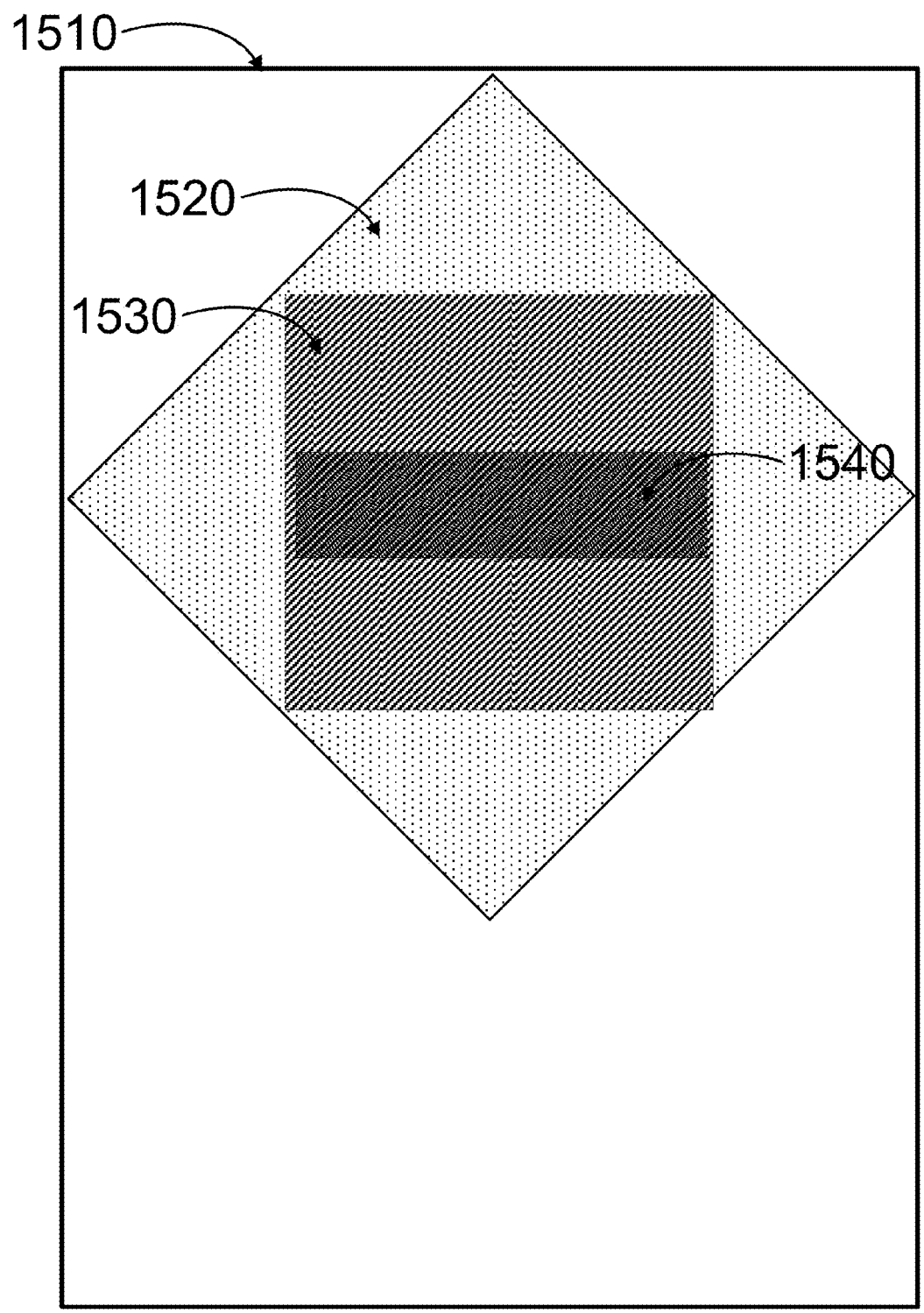
FIG. 15 shows an exemplary modified page on which the examples of the SDS arrangement may be practised.

FIG. 15 shows a modified version 1510 of the exemplary page 1210 that is received by the Cloud Program 130 in one example of this SDS arrangement. The modified page 1510 contains three objects, namely the bottom layer object 1520 is an opaque diamond, the second from bottom layer object 1530 is an opaque square referencing an external bitmap, and the top layer object 1540 is a text bounding box referencing an external text string. Note that the all text bounding boxes are treated as needing compositing with any underlying objects, regardless of whether the fill used to draw the text has transparency. This means that the underlying objects will be retained until the fillmap is rendered. These objects are required as the Cloud Program 130 cannot determine which pixels are obscured by the text until the external text string is incorporated into the fillmap.

Figure 16:
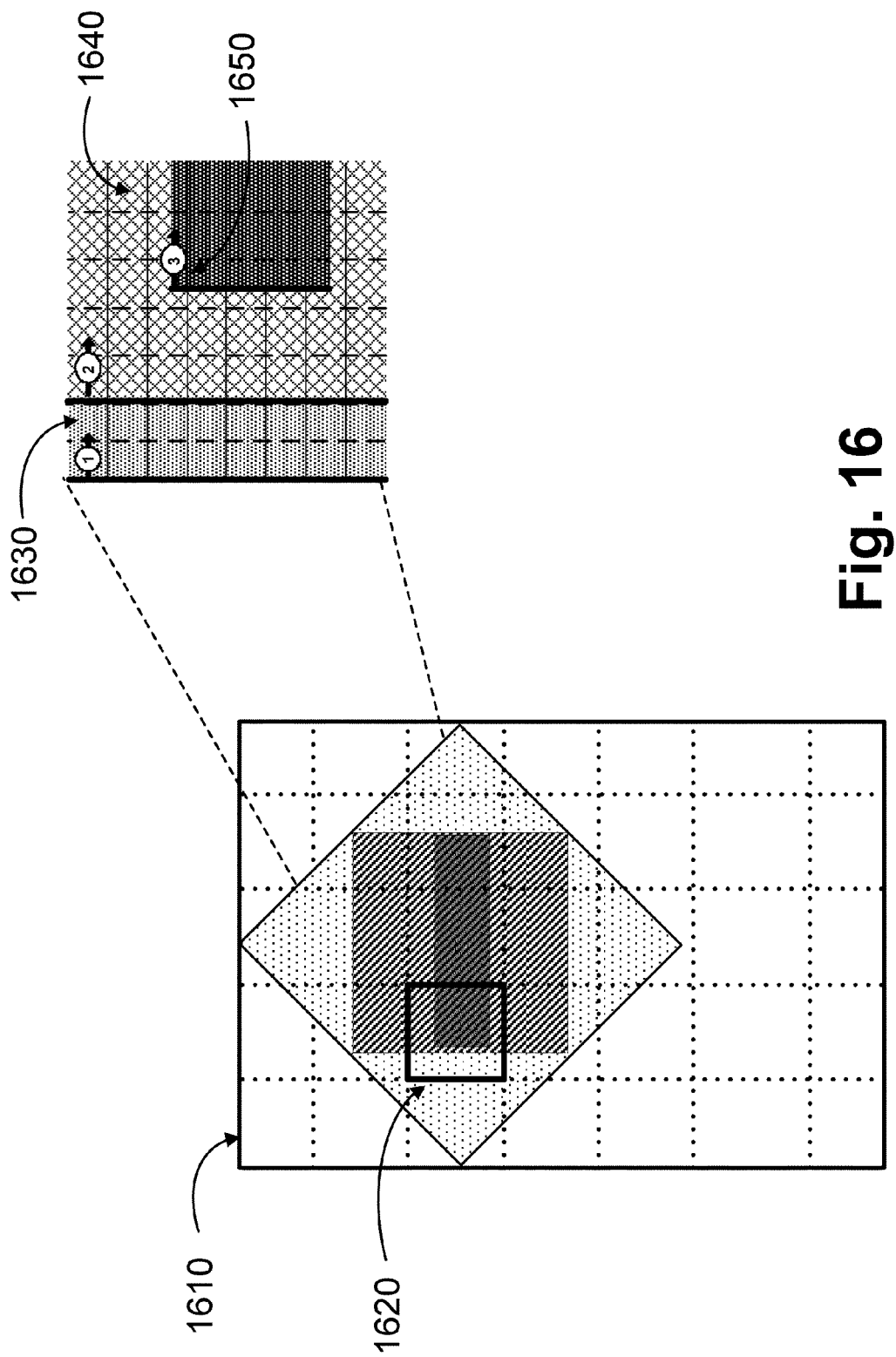
FIG. 16 shows a Tiled Fillmap intermediate representation for the exemplary page shown in FIG. 15.

FIG. 16 illustrates a Tiled Fillmap representation 1610 of the example modified page 1510. A Fillmap tile 1620 is at position (1, 2) expressed in (column, row) form. The contents of the fillmap tile 1620 are shown in expanded format on the right hand side of FIG. 16. Three regions 1630, 1640 and 1650 in the fillmap tile 1620 reference the fill compositing sequences with indices 1, 2 and 3 respectively.

Figure 17:
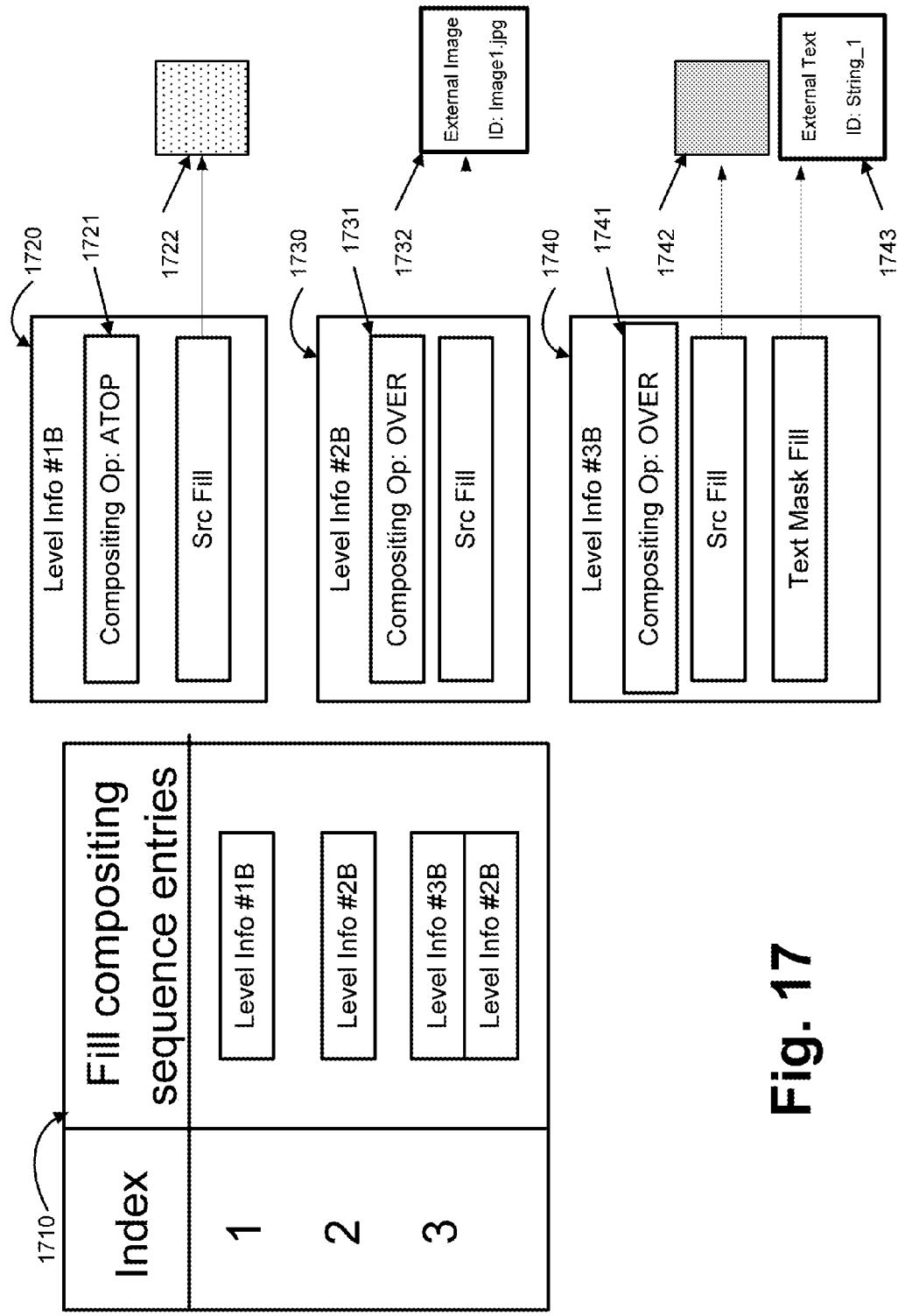
FIG. 17 shows the table of fill compositing sequences and corresponding Level Information for the Tiled Fillmap intermediate representation shown in FIG. 14.

FIG. 17 shows a table 1710 of fill compositing sequences and corresponding Level Information 1720, 1730, 1740 for the Tiled Fillmap 1610. Level Info #1B (ie 1720) contains rendering information corresponding to the opaque diamond object 1520. Level Info #1B (ie 1720) references a linear blend fill 1722 used to fill the opaque diamond 1520, and contains a compositing operator ATOP 1721. Level Info #2B (ie 1730) contains rendering information corresponding to the external bitmap object 1530. Level Info #2B (ie 1730) references an external bitmap source fill 1732 stored on the rendering device memory 165, and has a compositing operator OVER 1731. Level Info #3B (ie 1740) contains rendering information corresponding to the external text object 1540. Level Info #3B (ie 1740) references a flat grey source fill 1742 used to colour the text, has a compositing operator OVER 1741, and references a Text Mask Fill 1743, which is the text string stored in the Rendering Data Store 245.

Figure 18:
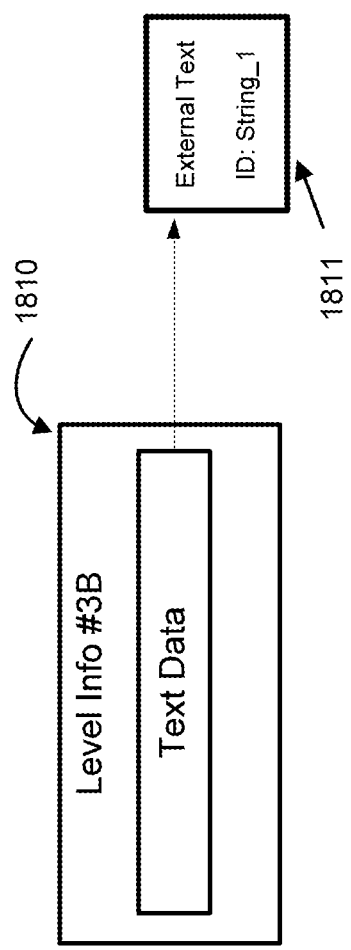
FIG. 18 shows an alternative form of Level Information for the Tiled Fillmap intermediate representation shown in FIG. 14.

FIG. 18 shows an alternative example of Level Info #3B (ie 1810), where the text string, fill colour and compositing operator are all stored in the Rendering Data Store 245. In this case, Level Info #3B (ie 1810) contains only a reference to the externally stored text data 1811.

Once the fillmap for the modified PDL has been created, the Cloud Program 130 creates any Ancillary Data 222 that the controlling program 145 needs to render the Intermediate Format File 218. This Ancillary Data 222 is created in the Ancillary Data Generation process 230. In a preferred SDS arrangement, this Ancillary Data consist of glyph data and colour space conversion data. The glyph data will consist of data for each font which is referenced in the Text Data stored in the Text Data Store 247. The colour space conversion information includes any data required to convert a source image stored in the Image Store 246 from the source colour space into the colour space used by the 135. For the example PDF Input File shown in FIG. 13, this Ancillary Data includes glyph data for the following fonts: Helvetica 30pt, Helvetica 15pt and Times-Roman 10pt. The glyph data consists of data for each character in the font. This character data may consist of either a bitmap or a set of edges, either of which describe the pixels activated by the character, together with kerning or placement information. An example of colour space conversion information is a look up table which describes the operation used to convert a source bitmap into the correct colour space used for rendering.

Once both the Intermediate Format File 218 and the Ancillary Data 222 have been created, they are sent, depicted by the Intermediate Format Transmission File 223 and the arrow 211, to the controlling program 145 executing in the controller processor 140. When this data 223 is received by the controlling program 145, the controlling program 145 combines, in the data conversion process 240, the Ancillary Data 222 with the Image and Text Data stored in the Renderer Data Store 245 to produce the Renderable Data 219 which can be used to render the Intermediate Format File 218. For Image Data this combination step 248 includes using any colour space conversion functions provided with the Ancillary data 222 to colour space convert the source image data into a colour space which can be used for rendering. For text data, the text string stored in the Renderer Store 245 is combined with the appropriate font data text bitmap that indicates the set of pixels that are activated by the bitmap fill. The text bitmap can either be produced at page resolution, which uses a simple translation operation to map between page pixels and the text bitmap, or else at a source resolution, which uses a page-to-text transform matrix to map between page pixels and the text bitmap.

Figure 19:
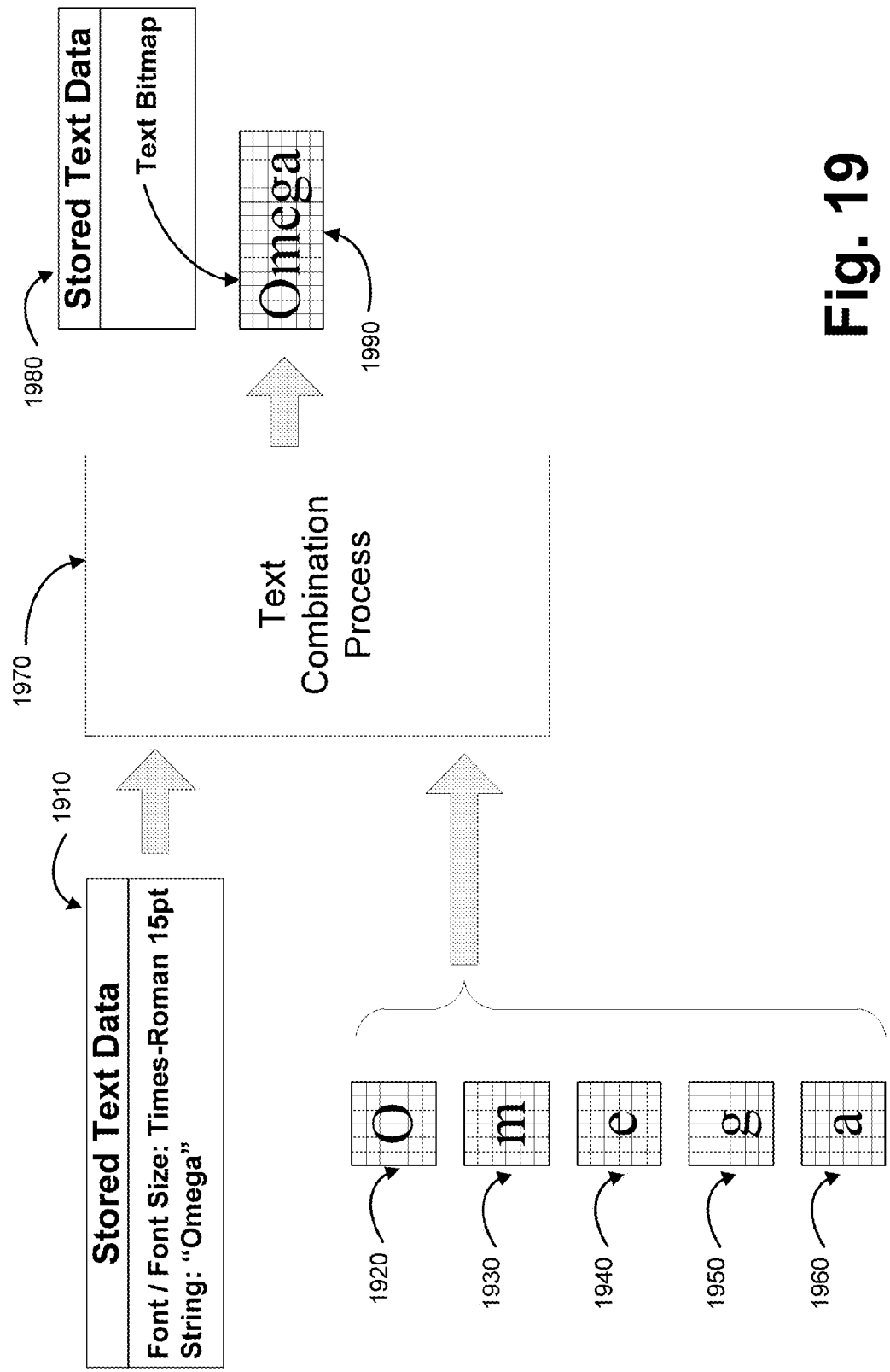
FIG. 19 shows an example of the Text Combination Process according to one example of the SDS arrangement.

An example of the text string to text bitmap process is shown in FIG. 19. The input to the text combination process 248 is Stored Text Data 1910 corresponding to the String "Omega" using Times-Roman 15pt Font, and the Character Data from the 15pt Times-Roman Font that are used in the string: 'O' (ie 1920), 'm' (ie 1930), 'e' (ie 1940), 'g' (ie 1950) and 'a' (ie 1960). This data is combined by the Text Combination Process 1970, which forms part of the incorporation process 248 (see FIG. 2) to produce a text bitmap representing the string "Omega" 1990. Combining the text comprises the steps of placing the glyph in the string bounding box according to rules such as character advancement and kerning. An example of combining characters into a string is given by the OpenType Specification. This bitmap is stored in the Renderer Store 245, and the Stored Text Data 1980 is updated to refer to the text bitmap 1990.

Once the extracted data stored in the Renderer Data Store 245 has been processed into a renderable form, the data is incorporated into the Intermediate Format File in the incorporation step 248. This involves replacing all references to external data in the corresponding Level Information for the Fillmap with the data stored in the Renderer Data Store 245.

Figure 20:
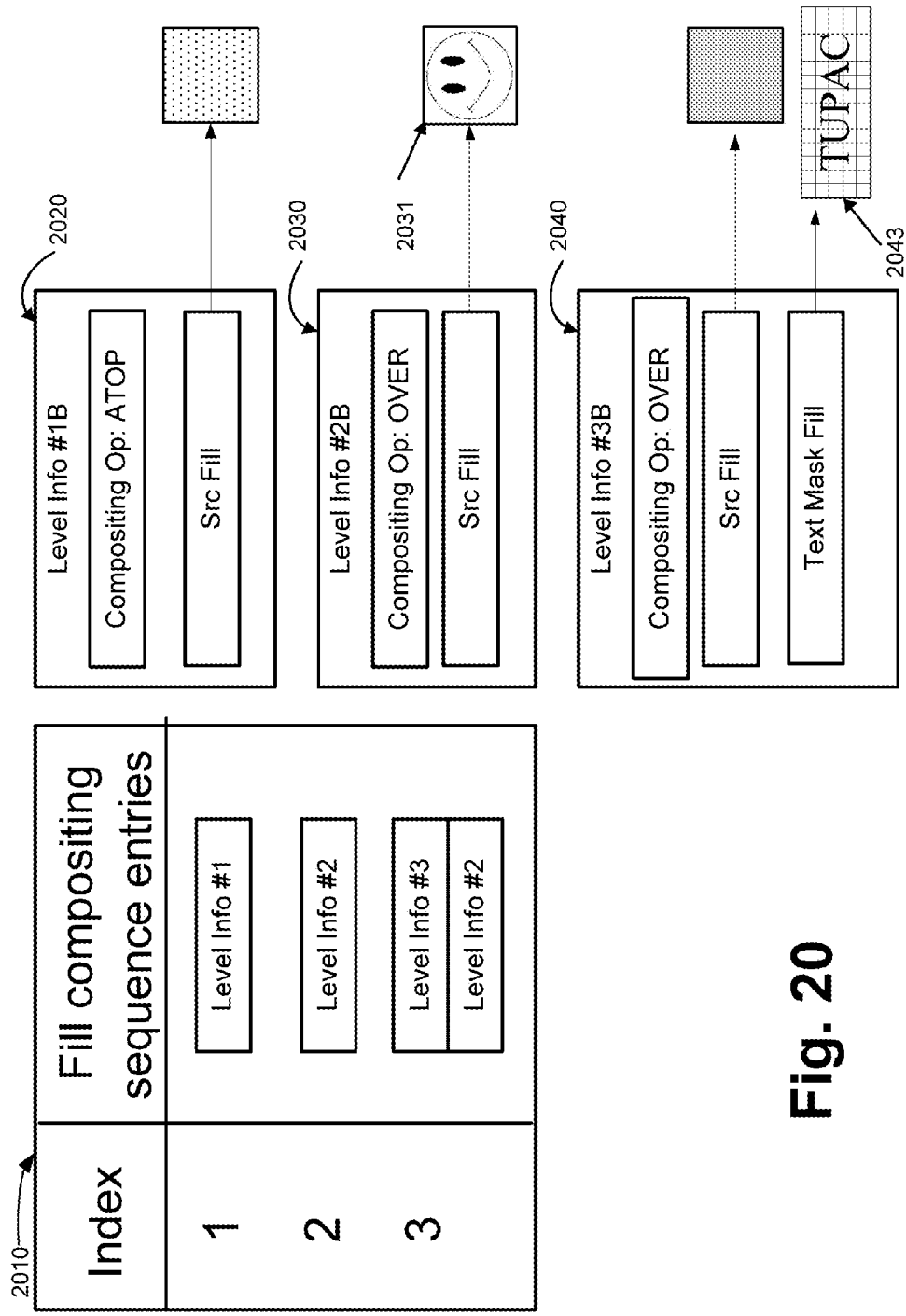
FIG. 20 shows the table of fill compositing sequences and corresponding Modified Level Information for the Tiled Fillmap intermediate representation shown in FIG. 14.

FIG. 20 shows a table of fill compositing sequences 2010 and updated Level Information 2020, 2030, 2040 for the Tiled Fillmap 1610. It can be seen that the reference to the external image data 1732 has been replaced by a reference to the actual image data 2032 stored within the Renderer Data Store 245. Similarly, the reference to the external text mask 1743 has been replaced by the text mask 2043 stored in the Renderer Store.

Figure 21:
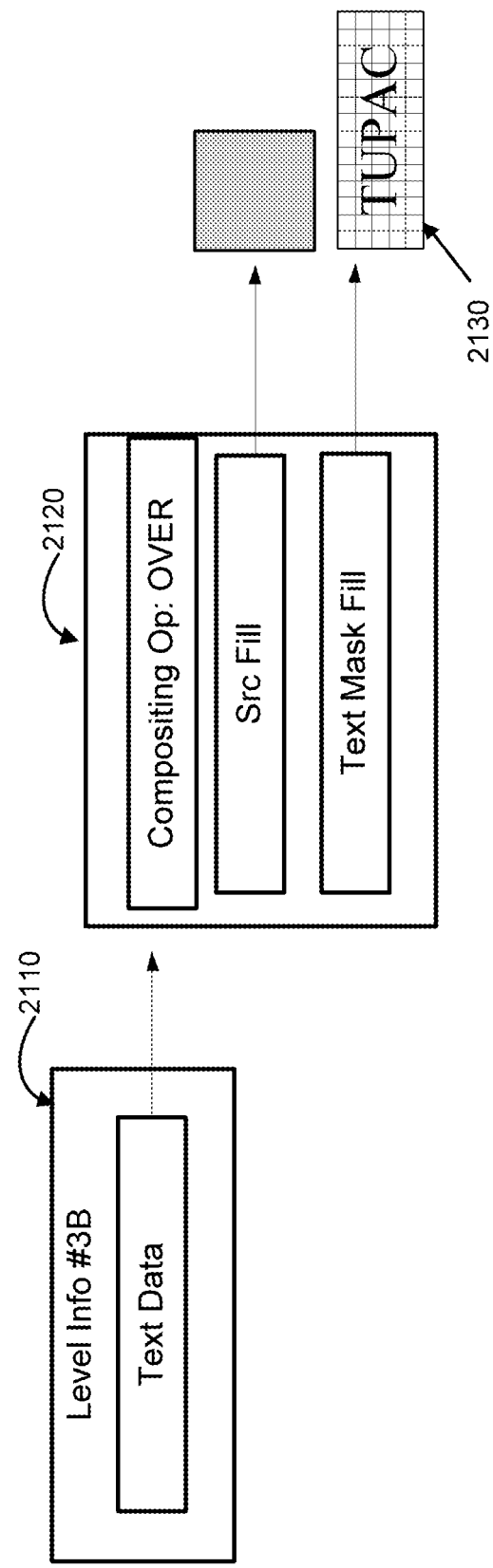
FIG. 21 shows an alternative form of Modified Level Information for the Tiled Fillmap intermediate representation shown in FIG. 14.

FIG. 21 shows updated Level Information 2110 for the alternative text handling method previously shown in FIG. 18. In this case Level Info #1B (ie 2110) is updated to point to the Text Data 2120 stored in the Renderer Data Store 245. The Text Data 2110 is updated to point to the new text bitmap 2130.

Once the Renderer Stored data has been incorporated into the Intermediate Format File, the resultant renderable file 219 can be rendered to pixel colour data 226 using the Pixel Rendering apparatus 160. Rendering the fillmap format file is performed by evaluating the appropriate fill compositing sequence at each pixel. Where an entry in the Fill Compositing Sequence refers to a Text Bitmap, the appropriate pixel is acquired from the bitmap, and the value tested. If the pixel is active, then the source fill is composited using the specified compositing operator. If it is not active, the entry in the Fill Compositing Sequence is ignored, and the next entry is processed.

Alternative Arrangement

Figure 22:
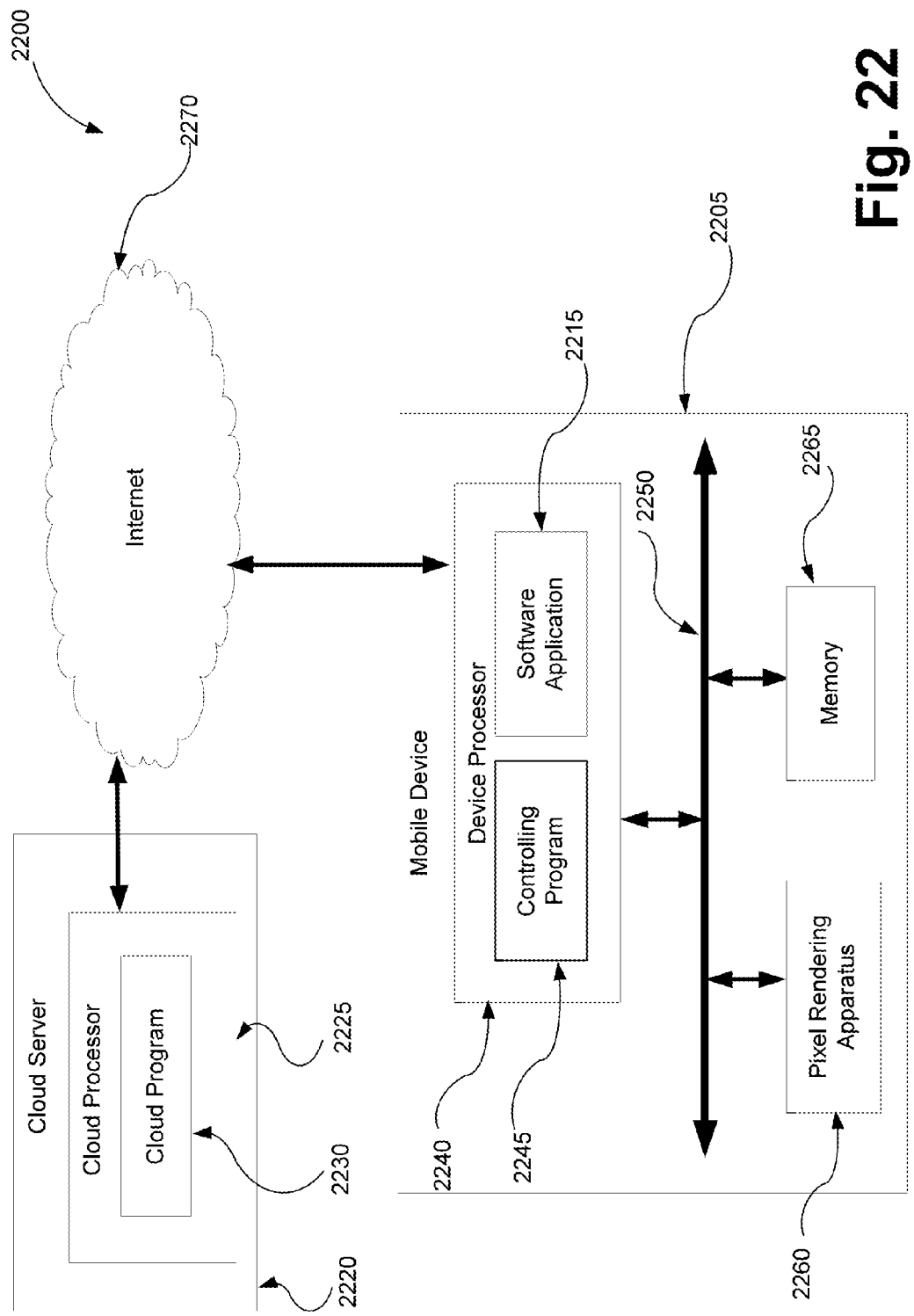
FIG. 22 is a schematic block diagram of an alternative pixel rendering system on which the examples of the SDS arrangement may be practised.

FIG. 22 shows a schematic block diagram of an alternative pixel rendering system 2200 for rendering computer graphic object images on which the examples of the present SDS arrangement may be practised.

The pixel rendering system 2200 comprises a mobile device 2205 and a cloud server 2220. The mobile device 2205 communicates with the cloud server 2220 via the internet 2270.

The mobile device 2205 comprises a device processor 2240 that executes both a controlling program 2245 that performs rendering, and a software application 2215, such as a word processor or graphical software application. The mobile device 2205 also comprises a pixel rendering apparatus 2260 and a memory 2265, coupled via a bus 2250. The pixel rendering apparatus 2260 may be in the form of an ASIC coupled via the bus 2255 to the device processor 2240. The pixel rendering apparatus 2260 may also be implemented in software executed in the device processor 2240. The pixel rendering apparatus 2260 will output pixel data to an output device, such as a display or a printer engine.

The cloud server 2220 comprises a cloud processor 2225 for executing a cloud program 2230, used to assist rendering.

In the pixel rendering system 2200, the software application 2215 executing in the mobile device 2205 creates page-based documents, where each page contains objects such as text, lines, fill regions, and image data. The software application 2215 passes a high level description of the page in the form of a Page Description Language (PDL) file to the controlling program 2245. The controlling program renders the file with the assistance of the Cloud Program 2230, which it contacts via the internet 2270.

INDUSTRIAL APPLICABILITY

The arrangements described are applicable to the computer and data processing industries and particularly for the printing industry.

The foregoing describes only some embodiments of the present invention, and modifications and/or changes can be made thereto without departing from the scope and spirit of the invention, the embodiments being illustrative and not restrictive.

The invention claimed is:

1. A method of rendering a page description language (PDL) document, the method comprising:

receiving, by a rendering device having a memory, a content stream of the PDL document;

removing, from the received content stream of the PDL document, a graphical object having a predetermined attribute;

storing data associated with the removed graphical object as removed data in the rendering device memory;

inserting, by the rendering device, a reference associated with the removed graphical object into the PDL document in place of the removed graphical object to produce an altered PDL document having the inserted reference;

transmitting the altered PDL document to a platform service device;

forming, from the altered PDL document and using the platform service device, an intermediate format representation in a format that is intermediate between a page description language and a bitmap, wherein the intermediate format representation contains the inserted reference;

receiving, by the rendering device from the platform service device, the intermediate format representation containing the inserted reference; and rendering, by the rendering device the intermediate format representation using the inserted reference, the stored removed data, and a drawing order of the removed graphical object in the content stream of the PDL document, wherein removing further includes:

determining whether the rendering device is able to convert the graphical object having the predetermined attribute to a renderable format, and keeping the graphical object in the PDL document if the rendering device is not able to convert the graphical object to the renderable format and the predetermined attribute indicates non-secure.

2. The method according to claim 1, wherein the received first page data includes a set of graphical objects having at least one graphical object that includes a predetermined attribute.

3. The method according to claim 1, wherein the received first page data is generated by a mobile device.

4. The method according to claim 1,
wherein the received first page data includes some page data having an attribute of being text data, and other page data having an attribute of being image data, and
wherein the predetermined attribute relates to the data which is text data such that the removed data stored in the memory is text data.

5. The method according to claim 1, wherein one or more of removing, inserting, storing, and forming includes performing at least one of compression of the respective page data, decompression of the respective page data, and color conversion of the respective page data, by at least one of the rendering device and the platform service device.

6. The method according to claim 1, wherein, in a case where the received first page data includes image data,
an image in the image data is transmitted to the platform service device in response to determining that the image is smaller than a predetermined size, and
the image in the image data is not transmitted to the platform service device and is processed by the rendering device in response to determining that the image is equal to or greater than the predetermined size.

7. The method according to claim 1, further comprising generating, by the rendering device, the reference associated with the removed data stored in the rendering device memory, wherein the reference indicate at least a font size and a glyph list associated with.

8. The method according to claim 1, wherein the reference to the removed data is inserted into the PDL document by the rendering device based on the drawing order of the removed data in the content stream of the PDL document.

9. The method according to claim 1, wherein rendering comprises compositing the intermediate format representation and the stored removed data using the inserted reference and the drawing order of the removed data in the content stream of the PDL document.

10. The method according to claim 1, wherein the altered PDL document is further modified to conform to a PDL standard.

11. The method according to claim 1, further comprises:
converting the stored removed data using ancillary data received from the platform service device to form data renderable by the rendering device; and
compositing the formed renderable data with the intermediate format representation using the drawing order of the removed data in the content stream and compositing operations in the corresponding fill compositing sequence.

12. The method according to claim 1,
wherein removing further includes removing from the PDL document the graphical object if the rendering device is able to convert the graphical object to the renderable format and the graphical object meets size requirements, and
wherein the predetermined attribute is "Non-Secure" so that the predetermined attribute indicates non-secure.

13. The method according to claim 1, wherein forming the intermediate format representation further comprises accessing, by the platform service device, the removed stored data if the removed stored data is marked as "Non-secure," wherein the removed stored data is accessed to render at least a portion of the altered PDL document to pixels thereby to avoid exceeding system limitations of at least one of the rendering device and the platform service device.

14. A method for a rendering device, having a memory, to render a page description language (PDL) document, the method comprising:
receiving a content stream of the PDL document;
removing, from the received content stream of the PDL document, a graphical object having a predetermined attribute;
storing data associated with the removed graphical object as removed data in the memory;
inserting a reference associated with the removed graphical object into the PDL document in place of the removed graphical object to produce an altered PDL document having the inserted reference;
transmitting the altered PDL document to a platform service device;
receiving, from the platform service device in response to transmitting the altered PDL document, an intermediate format representation containing the inserted reference in a format that is intermediate between a page description language and a bitmap, wherein the intermediate format representation was formed by the platform service device from the altered PDL document; and
rendering, the intermediate format representation using the inserted reference, the stored removed data, and a drawing order of the removed graphical object in the content stream of the PDL document,
wherein removing further includes:
determining whether the rendering device is able to convert the graphical object having the predetermined attribute to a renderable format, and
keeping the graphical object in the PDL document if the rendering device is not able to convert the graphical object to the renderable format and the predetermined attribute indicates non-secure.

15. A method of rendering a page description language (PDL) document and securely printing the document, the method comprising:
receiving, by a rendering device having a memory, a content stream of the PDL document;
removing, from the received content stream of the PDL document, a graphical object satisfying a predetermined security attribute, wherein data associated with the removed graphical object is stored as removed data in the rendering device memory;
inserting a reference associated with the removed graphical object into the PDL document in place of the removed graphical object to produce an altered PDL document having the inserted reference;
transmitting the altered PDL document to a platform service device;
forming, from the altered PDL document and using the platform service device, an intermediate format representation in a format that is intermediate between a page description language and a bitmap, wherein the intermediate format representation contains the inserted reference;
receiving, by the rendering device from the platform service device, the intermediate format representation containing the inserted reference; and
rendering, by the rendering device, the intermediate format representation using the inserted reference, the stored removed data, and a drawing order of the removed graphical object in the content stream of the PDL document,
wherein removing further includes:
determining whether the rendering device is able to convert the graphical object having the predetermined security attribute to a renderable format, and
keeping the graphical object in the PDL document if the rendering device is not able to convert the graphical object to the renderable format and the predetermined security attribute indicates non-secure.

16. A system to render a page description language (PDL) document, the system comprising:
a client device;
a platform service device; and
a rendering device having a rendering device processor and a rendering device memory storing a rendering computer executable controlling program configured to direct the rendering device processor to perform a method that includes:
receiving, from the client device, a content stream of the PDL document;
removing, from the received content stream of the PDL document, a graphical object having a predetermined attribute;
storing data associated with the removed graphical object as removed data in the rendering device memory;
inserting a reference associated with the removed graphical object into the PDL document in place of the removed graphical object to produce an altered PDL document having the inserted reference; and
transmitting the altered PDL document to the platform service device, wherein removing further includes:
determining whether the rendering device is able to convert the graphical object having the predetermined attribute to a renderable format, and
keeping the graphical object in the PDL document if the rendering device is not able to convert the graphical object to the renderable format and the predetermined attribute indicates non-secure,
wherein the platform service device includes a platform service device processor and a platform service device memory storing a platform service computer executable controlling program configured to direct the platform service device processor to perform a method that includes:
forming, from the altered PDL document, an intermediate format representation in a format that is intermediate between a page description language and a bitmap, wherein the intermediate format representation contains the inserted reference, and
wherein the rendering computer executable controlling program further is configured to direct the rendering device processor to perform a method that includes:
receiving, from the platform service device, the intermediate format representation containing the inserted reference, and
rendering the intermediate format representation using the inserted reference, the stored removed data, and a drawing order of the removed graphical object in the content stream of the PDL document.

17. A rendering device, having a memory, to render a page description language (PDL), the rendering device comprising:
a processor; and
a memory storing a computer executable controlling program configured to direct the processor to perform a method that includes:
receiving a content stream of the PDL document;
removing, from the received content stream of the PDL document, a graphical object having a predetermined attribute;
storing data associated with the removed graphical object as removed data in the memory;
inserting a reference associated with the removed graphical object into the PDL document in place of the removed graphical object to produce an altered PDL document having the inserted reference;
transmitting the altered PDL document to a platform service device;
receiving, from the platform service device in response to transmitting the altered PDL document, an intermediate format representation in a format that is intermediate between a page description language and a bitmap, wherein the intermediate format representation was formed by the platform service device in from the altered PDL document and the intermediate format representation contains the inserted reference; and
rendering, to generate the document, the intermediate format representation using the inserted reference, the stored removed data, and a drawing order of the removed graphical object in the content stream of the PDL document,
wherein removing further includes:
determining whether the rendering device is able to convert the graphical object having the predetermined attribute to a renderable format, and
keeping the graphical object in the PDL document if the rendering device is not able to convert the graphical object to the renderable format and the predetermined attribute indicates non-secure.

18. A non-transitory computer readable memory medium storing a computer executable program to direct one or more processors to execute a method of rendering a page description language (PDL), the method comprising:
receiving, by a rendering device having a memory, a content stream of the PDL document;
removing, from the received content stream of the PDL document, a graphical object having a predetermined attribute;
storing data associated with the removed graphical object as removed data in the rendering device memory;
inserting, by the rendering device, a reference associated with the removed graphical object into the received PDL document in place of the removed graphical object to produce altered PDL document having the inserted reference;
transmitting the altered PDL document to a platform service device;
forming, from the PDL document, an intermediate format representation in a format that is intermediate between a page description language and a bitmap, wherein the intermediate format representation contains the inserted reference;
receiving, by the rendering device from the platform service device, the intermediate format representation containing the inserted reference; and
rendering, by the rendering device to generate the document, the intermediate format representation using the inserted reference, the stored removed data, and a drawing order of the removed graphical object in the content stream of the PDL document,
wherein removing further includes:
determining whether the rendering device is able to convert the graphical object having the predetermined attribute to a renderable format, and
keeping the graphical object in the PDL document if the rendering device is not able to convert the graphical object to the renderable format and the predetermined attribute indicates non-secure.

19. A non-transitory computer readable memory medium storing a computer executable program to direct one or more processors to execute a method for a rendering device, having a memory, to render a PDL document, the method comprising:
receiving a content stream of the PDL document;
removing, from the received content stream of the PDL document, a graphical object having a predetermined attribute;
storing data associated with the removed graphical object as removed data in the memory;
inserting a reference associated with the removed graphical object into the content stream of the PDL document to produce altered PDL document having the inserted reference;
transmitting the altered PDL document to a platform service device;
receiving, from the platform service device in response to transmitting the altered PDL document, an intermediate format representation intermediate between a page description language and a bitmap, wherein the intermediate format representation contains the inserted reference, wherein intermediate format representation was formed by the platform service device from the altered PDL document; and rendering the intermediate format representation using the inserted reference, the stored removed data, and a drawing order of the removed graphical object in the content stream of the PDL document, wherein removing further includes:

determining whether the rendering device is able to convert the graphical object having the predetermined attribute to a renderable format, and keeping the graphical object in the PDL document if the rendering device is not able to convert the graphical object to the renderable format and the predetermined attribute indicates non-secure.

20. A method of rendering a page description language (PDL) document by a rendering device, the method comprising:

receiving a content stream of the PDL document;

parsing the content stream to identify source data of a secure graphical object not to be transmitted to a platform service device;

modifying the PDL document by removing the identified source data from the content stream of the PDL document and replacing the removed source data with a reference wherein the modified PDL document conforms to a PDL standard;

transmitting the modified PDL document to the platform service device wherein the identified source data is not used by the platform service device;

receiving, from the platform service device, an intermediate format representation of the modified PDL document and ancillary data for the removed source data, wherein the intermediate format representation contains the inserted reference and is in the format intermediate between a page description language and a bitmap;

converting, by the rendering device using the ancillary data, the source data of the secure graphical object to a representation renderable by the rendering device; and compositing, by the rendering device, the intermediate format representation using the inserted reference to render the PDL document, wherein parsing further includes:

determining whether the rendering device is able to convert the secure graphical object to a renderable format, and keeping the graphical object in the PDL document if the rendering device is not able to convert the secure graphical object to the renderable format.

* * * * *